United States Patent
Geens et al.

(10) Patent No.: US 11,262,519 B2
(45) Date of Patent: Mar. 1, 2022

(54) CABLE SLACK STORAGE DEVICE

(71) Applicant: COMMSCOPE CONNECTIVITY BELGIUM BVBA, Kessel-Lo (BE)

(72) Inventors: Johan Geens, Bunsbeek (BE); Jan Willem Rietveld, Benschop (NL); Bart Vos, Geel (BE); Olivier Hubert Daniel Yves Rousseaux, Brussels (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 296 days.

(21) Appl. No.: 16/302,469

(22) PCT Filed: May 17, 2017

(86) PCT No.: PCT/EP2017/061838
§ 371 (c)(1),
(2) Date: Nov. 16, 2018

(87) PCT Pub. No.: WO2017/198708
PCT Pub. Date: Nov. 23, 2017

(65) Prior Publication Data
US 2019/0278040 A1    Sep. 12, 2019

Related U.S. Application Data

(60) Provisional application No. 62/338,239, filed on May 18, 2016, provisional application No. 62/352,260, filed on Jun. 20, 2016.

(51) Int. Cl.
*G02B 6/00* (2006.01)
*G02B 6/44* (2006.01)
(Continued)

(52) U.S. Cl.
CPC ....... *G02B 6/4457* (2013.01); *B65H 54/2896* (2013.01); *B65H 57/20* (2013.01);
(Continued)

(58) Field of Classification Search
CPC .. G02B 6/4457; G02B 6/3825; G02B 6/3897; G02B 6/4471; G02B 6/4497;
(Continued)

(56) References Cited

U.S. PATENT DOCUMENTS 7,264,402 B2   9/2007   Theuerkorn et al.
7,744,286 B2   6/2010   Lu et al.
(Continued)

FOREIGN PATENT DOCUMENTS

EP   2 169 438 A1   3/2010
JP   2005-024978 A   1/2005

OTHER PUBLICATIONS

International Search Report and Written Opinion of the International Searching Authority for International Patent Application No. PCT/EP2017/061838 dated Jul. 28, 2017, 14 pages.

*Primary Examiner* — Kaveh C Kianni
*Assistant Examiner* — Hung Q Lam
(74) *Attorney, Agent, or Firm* — Merchant & Gould P.C.

(57) ABSTRACT

A cable storage device (100) includes a removal station (110) and a storage spool (120). Slack length of the cable (190) is advanced into the cable storage device. At least a jacket (195) of the cable (190) is removed at the removal station (110). At least a signal-carrying portion of the cable (190) is wound at the storage spool (120). The removed jacket (195) exits the cable storage device (100). The cable (190) can be axially secured at the cable storage device (100). Certain types of spools can index the cable.

25 Claims, 26 Drawing Sheets

(51) Int. Cl.
  *B65H 54/28*  (2006.01)
  *B65H 57/20*  (2006.01)
  *B65H 75/40*  (2006.01)
  *G02B 6/38*   (2006.01)

(52) U.S. Cl.
  CPC ........... *B65H 75/40* (2013.01); *G02B 6/3825* (2013.01); *G02B 6/3897* (2013.01); *G02B 6/4471* (2013.01); *G02B 6/4497* (2013.01); *B65H 2701/32* (2013.01)

(58) Field of Classification Search
  CPC .... B65H 54/2896; B65H 57/20; B65H 75/40; B65H 2701/32
  USPC .................................................. 385/134–137
  See application file for complete search history.

(56) References Cited

U.S. PATENT DOCUMENTS

| | | |
|---|---|---|
| 7,744,288 B2 | 6/2010 | Lu et al. |
| 7,762,726 B2 | 7/2010 | Lu et al. |
| 7,942,590 B2 | 5/2011 | Lu et al. |
| 7,959,361 B2 | 6/2011 | Lu et al. |
| 9,348,096 B2 | 5/2016 | Kmit et al. |
| 2008/0170832 A1* | 7/2008 | Mullaney ............. G02B 6/4477 385/135 |
| 2013/0284843 A1 | 10/2013 | Mertesdorf |
| 2014/0126871 A1 | 5/2014 | Kanayama et al. |
| 2014/0254986 A1 | 9/2014 | Kmit et al. |

* cited by examiner

CABLE SLACK STORAGE DEVICE

CROSS-REFERENCE TO RELATED APPLICATIONS

This application is a National Stage of PCT/EP2017/061838, filed on May 17, 2017, which claims the benefit of U.S. Patent Application Ser. No. 62/352,260, filed on Jun. 20, 2016, and claims the benefit of U.S. Patent Application Ser. No. 62/338,239, filed on May 18, 2016, the disclosures of which are incorporated herein by reference in their entireties. To the extent appropriate, a claim of priority is made to each of the above disclosed applications.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 10 deploying fiber optic lines. As shown, the network 10 can include a central office 11 that connects a number of end subscribers 15 (also called end users 15 herein) in a network. The central office 11 can additionally connect to a larger network such as the Internet (not shown) and/or a public switched telephone network (PSTN). The network 10 can also include fiber distribution hubs (FDHs) 13 that distribute optical signals to the end users 15. The various lines of the network 10 can be aerial or housed within underground conduits.

The portion of the network 10 that is closest to central office 11 is generally referred to as the F1 region, where F1 is the "feeder fiber" from the central office 11. The portion of the network 10 closest to the end users 15 can be referred to as an F2 portion of network 10. The network 10 includes a plurality of break-out locations 12 at which branch cables are separated out from the main cable lines. Branch cables are often connected to drop terminals 14, for example, via fiber distribution hubs 13. The drop terminals 14 include connector interfaces for facilitating coupling of the fibers of the branch cables to a plurality of different subscriber locations 15.

SUMMARY

Some aspects of the disclosure are directed to a storage device storing excess length of a cable extending between first and second axial ends of the cable. The cable has a first jacketed portion disposed at the first axial end, a second jacketed portion disposed at the second axial end, and an unjacketed portion disposed between the first and second jacketed portions. The storage device includes a housing defining an interior; a first cable port through which the first jacketed portion of the cable enters the housing so that the first axial end of the cable is external of the housing; a second cable port through which the second jacketed portion of the cable enters the housing so that the second axial end of the cable is external of the storage device; a removing station disposed in the housing; a storage spool configured to wind the inner portion of the cable; and an exit aperture through which the jacket from which the inner portion is separated exits the housing. The second jacketed portion of the cable is longer than the first jacketed portion of the cable. The removal station is configured to separate an inner portion of the second jacketed portion of the cable from a jacket of the second jacketed portion of the cable to lengthen the unjacketed portion of the cable.

In certain implementations, the housing provides axial pull resistance at the first and second cable ports to inhibit the first and second jacketed portions from pulling out of the respective cable ports.

In certain implementations, the storage spool is rotatable relative to the housing and removal station.

In certain implementations, a blade arrangement is disposed at the removal station between the first cable port and the storage spool. In some examples, the blade arrangement includes a stationary blade. In other examples, the blade arrangement includes an annular blade that is rotatable relative to the housing. In certain examples, the blade arrangement also includes a gear that rotates in unison with the annular blade, wherein the storage spool includes radially outwardly extending teeth that mesh with the gear. In examples, the blade arrangement defines a keyed recess sized and shaped to receive a tool to aid in rotating the storage spool relative to the housing.

In certain implementations, the storage spool includes a handle and the housing includes a handle that facilitate rotating the storage spool relative to the housing.

In certain implementations, the storage spool defines a mounting station at which the first axial end of the cable can be disposed to rotate in unison with the storage spool.

In certain implementations, the storage spool defines at least one drop port. In certain examples, the cable includes a plurality of signal-carrying portions, at least one of the signal carrying portions extending between the first and second axial ends of the cable, and at least another of the signal carrying portions extending from the first axial end of the cable to a drop end that is accessible via the at least one drop port.

In some examples, the drop end extends out of the housing through the at least one drop port. In other examples, the storage spool includes an adapter defining an interior port and an exterior port. The interior port receives the drop end. The exterior port is accessible from an exterior of the housing.

Other aspects of the disclosure are directed to a system for assembling multiple types of terminals using standardized components. The system includes a main housing defining an interior; a first component structured to selectively mount within the interior of the main housing; a second component structured to selectively mount within the interior of the main housing; wherein either of the first component or the second component can be assembled to the main housing to form a terminal. The main housing defines a cable port leading to the interior. A first portion of the first component is accessible from an exterior of the main housing. The first portion defines a second cable port. The first component includes a cable spool that is rotatable relative to the main housing when mounted within the interior of the main housing. A second portion of the second component is accessible from an exterior of the main housing. The second portion defines a second cable port and at least one drop port.

In certain implementations, the main housing holds a blade within the interior and defines an exit aperture in line with the blade.

In certain implementations, the second component includes a cable spool that is rotatable relative to the main housing when mounted within the interior of the main housing.

In certain implementations, the second portion of the second component routes a signal-carrying component of a cable received at the cable port of the main housing to the second cable port of the second component; and the second portion of the second component routes another signal-carrying component of the cable to the drop port of the second component.

In certain implementations, the second component is rotationally locked relative to the main housing.

In certain implementations, a closure member is mounted to the main housing to rotationally lock the selected one of the first component and the second component to the main housing.

Other aspects of the disclosure are directed to a storage device for storing excess length of a cable. The storage device includes a housing defining a first cable port and a second cable port; a spool carried by the housing; a cutting tool carried by the housing; a channel defined in the housing body leading from the second cable port, past the cutting tool, to the exit aperture, the channel also opening to a drum of the spool. The spool is rotatable relative to the housing. The cutting tool is disposed between the second cable port and the spool.

In certain implementations, the cutting tool is a blade held stationary relative to the housing.

In certain implementations, the cutting tool moves relative to the housing.

In certain implementations, the spool includes a handle configured to facilitate rotation of the spool by a user. In certain examples, the handle defines a channel leading from the spool to the first cable port.

In certain examples, the handle is a first handle, the housing includes a second handle disposed at an opposite side of the storage device from the first handle, and the first handle is movable relative to the second handle.

In certain implementations, the housing includes a mounting station configured to receive a first axial end of a cable to be stored at the storage device.

In certain examples, the mounting station is configured to receive a connector terminating the first axial end of the cable. In an example, the mounting station includes a flexible arm configured to latch to the connector.

In certain implementations, the housing includes a first housing piece and a second housing piece that hold at least a portion of the spool there between so that the spool is rotatable relative to both the first and second housing pieces.

In certain implementations, a cable extends between a first axial end and a second axial end. Each axial end is external of the housing. A bight of the cable extends through the second cable port, along the channel, to the cutting tool at which a jacket of the cable is separated from an inner portion of the cable. The jacket extends through the exit aperture, the inner portion wrapped around the spool.

Other aspects of the disclosure are directed to a method of customizing an amount of slack length of a cable that can be stored. The cable extends from a first axial end to a second axial end. The cable has an inner portion surrounded by a jacket. The method includes separating the jacket of the cable from the inner portion of the cable along a first length of the cable to form an unjacketed portion of the cable; and routing the unjacketed portion of the cable through an interior of the cable storage device. The unjacketed portion extends between a first jacketed portion of the cable and a second jacketed portion of the cable. The first jacketed portion forms the first axial end of the cable; the second jacketed portion forms the second axial end of the cable. The second jacketed portion of the cable extends out of the second cable port defined in the cable storage device. The separated jacket extends out of an exit aperture defined in the cable storage device. The first jacketed portion of the cable extends out of a cable port defined in the cable storage device.

In certain implementations, the method may include environmentally sealing the cable storage device.

In certain implementations, mounting the first axial end of the cable at an exterior of a cable storage device. The second axial end of the cable remains freely movable relative to the cable storage device.

In certain implementations, routing the unjacketed portion of the cable through the interior of the cable storage device comprises routing the unjacketed portion partially around a drum of a storage spool and along a path between the storage spool and a removal station disposed within the cable storage device.

Other aspects of the disclosure are directed to a method of storing slack length of a cable using a cable storage device. The cable extends between first and second axial ends. The method includes rotating a handle of the cable storage device; pulling the cable into the cable storage device and past a removal station by rotating the handle; making an incision in the jacket of the cable as the cable is pulled past the removal station to enable separation of the jacket from an inner portion of the cable; separating the jacket from the inner portion of the cable by routing the jacket from the removal station to an exit aperture while routing the inner portion of the cable from the removal station to a storage cavity disposed within the cable storage device; and winding the inner portion of the cable within the storage cavity.

In certain implementations, the method includes rotating the handle winds the inner portion of the cable within the storage cavity, which implements pulling the cable into the housing.

In certain implementations, the first axial end of the cable rotates in unison with the handle. In certain examples, the first axial end of the cable is mounted external to the cable storage device.

In certain implementations, the method includes cutting the jacket at the exit aperture when the slack storage of the cable has been wound within the storage cavity; and mounting a closing member over the exit aperture.

In certain examples, mounting the closing member over the exit aperture comprises securing the jacket to the cable storage device with the closing member.

In certain examples, mounting the closing member over the exit aperture environmentally seals an interior of the cable storage device.

In certain implementations, the method includes mounting the cable storage device at a mounting location.

In certain implementations, the method also includes disconnecting a first axial end of the cable from the cable storage device; and making a connection with the first axial end of the cable at the mounting location.

In certain examples, the mounting location is remote from the first and second axial ends of the cable. In certain examples, the second axial end of the cable is connected at the mounting location.

In certain implementations, the method includes directing strength members of the jacket from the removal station to the exit aperture so that the strength members are separated from the inner portion of the cable along with the jacket.

Other aspects of the disclosure are directed to a method of storing excess slack length of an indexing cable having at least a first signal-carrying portion extending between first and second axial ends of the indexing cable. The indexing cable also has at least a second signal-carrying portion extending from the first axial end to a drop end separate from the second axial end. The first signal-carrying portion is indexed between the first and second axial ends. The indexing cable has an unjacketed portion disposed inside of a cable storage device. The second axial end and drop end are carried by a first portion of the cable storage device. The method includes connecting the second axial end of the indexing cable at a connection location; taking up slack length of the indexing cable by rotating the first portion of the cable storage device relative to the second portion; mounting the cable storage device at a mounting location; determining a desired orientation of the drop end of the cable storage device relative to the second axial end of the indexing cable; rotating the first portion relative to the second portion until the drop end faces in the desired orientation; and locking the first portion of the cable storage device relative to the second portion.

Other aspects of the disclosure are directed to a method of storing excess slack length of a cable extending between first and second axial end. The method includes separating a jacket from an inner portion of a segment of a cable to form an unjacketed segment, the unjacketed segment being spaced from the axial ends of the cable so that the axial ends of the cable remain jacketed; directing the separated jacket away from the inner portion of the unjacketed segment; winding the inner portion of the unjacketed segment of the cable around a cable spool of a cable storage device; and securing the jacket to the cable storage device.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to a cable storage device that stores slack length of a cable in a compact configuration. The cable storage device stores the signal carrying portion of the slack length without an outer jacket. Certain types of cable storage devices store the signal carrying portion of the slack length without strength members. Certain types of cable storage devices enable a user to customize the amount of slack length of the cable that is stored during or after deployment of the cable.

In accordance with some aspects of the disclosure, the cable storage device includes a jacket separation station at which a jacket of the cable is separated from a signal carrying portion of the cable to form an unjacketed segment of the cable. In certain implementations, the unjacketed segment is spaced from the axial ends of the cable so that the axial ends of the cable remain jacketed. The cable storage device allows the unjacketed portion of the cable to be wound in a cable storage loop while the separated jacket is directed out of the cable storage device. When a sufficient amount of slack length of the signal carrying portion has been wound, the signal carrying portion can be environmentally sealed within the cable storage device.

Figure 1:
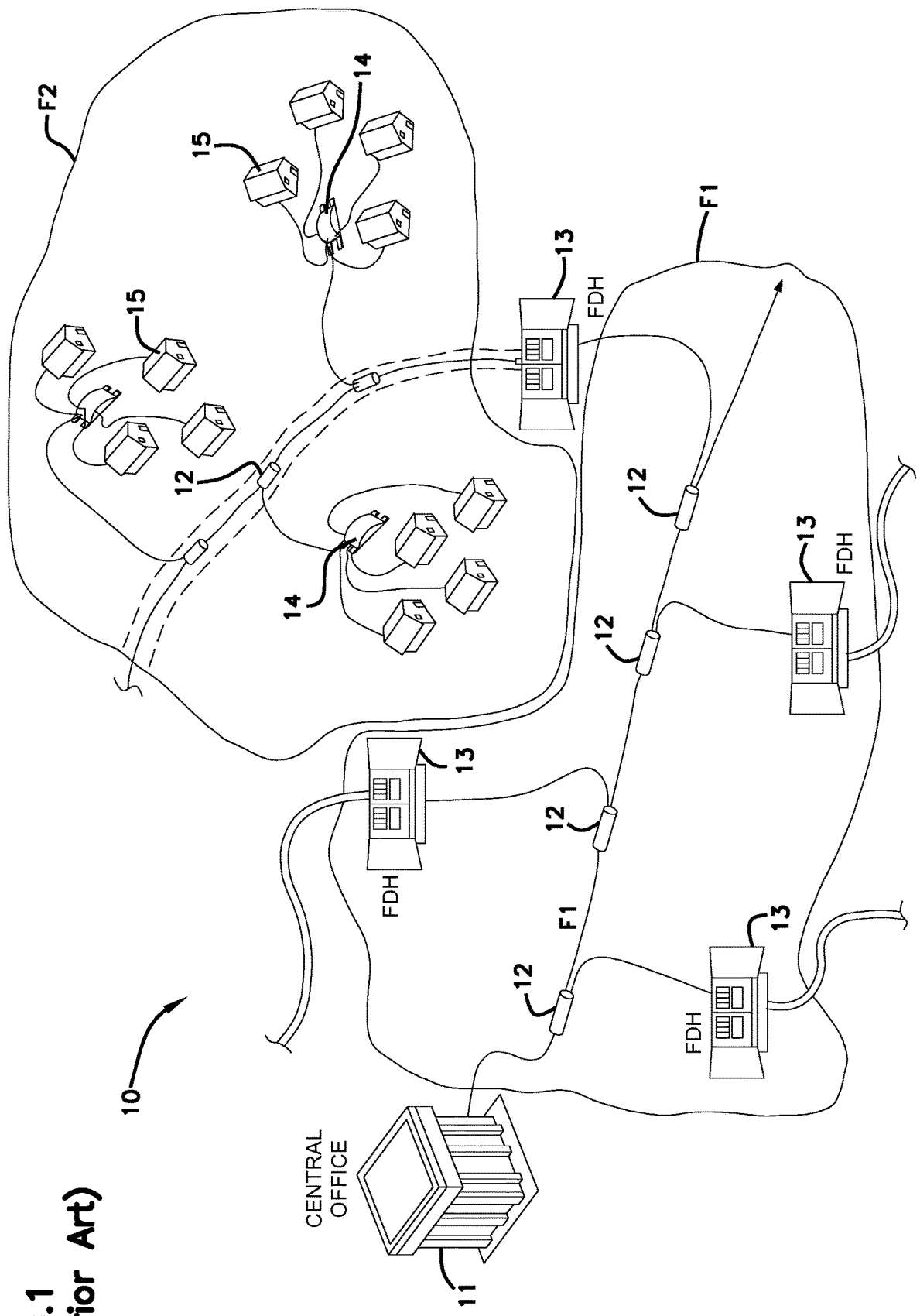
FIG. 1 is a schematic diagram of an example fiber optic network.
Figure 2:
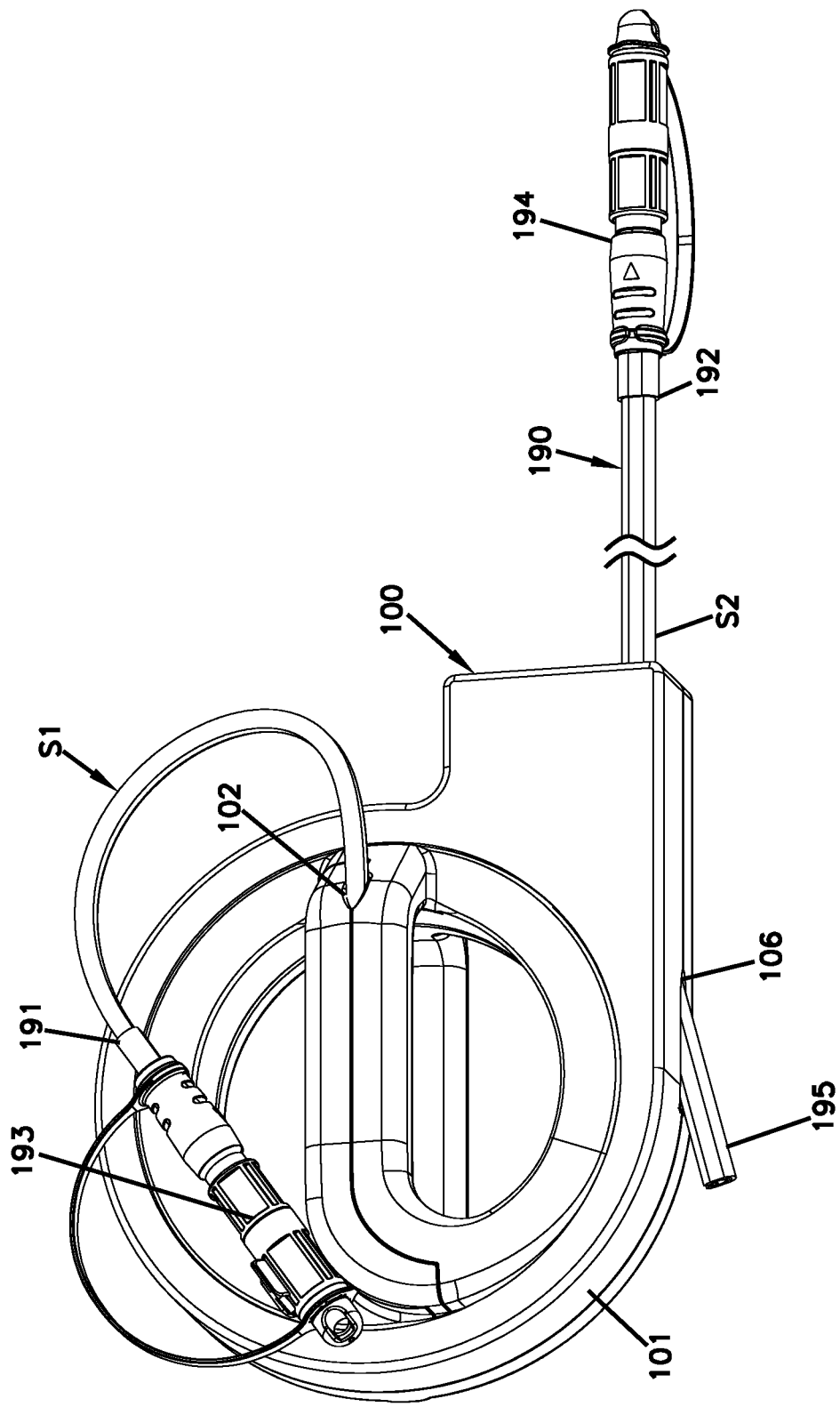
FIG. 2 is a first side perspective view of a cable storage device installed on a cable so that a first axial end of the cable rotates with a cable spool of the cable storage device and the second axial end of the cable is advanced into the cable storage device to take up excess length of the cable.
Figure 3:
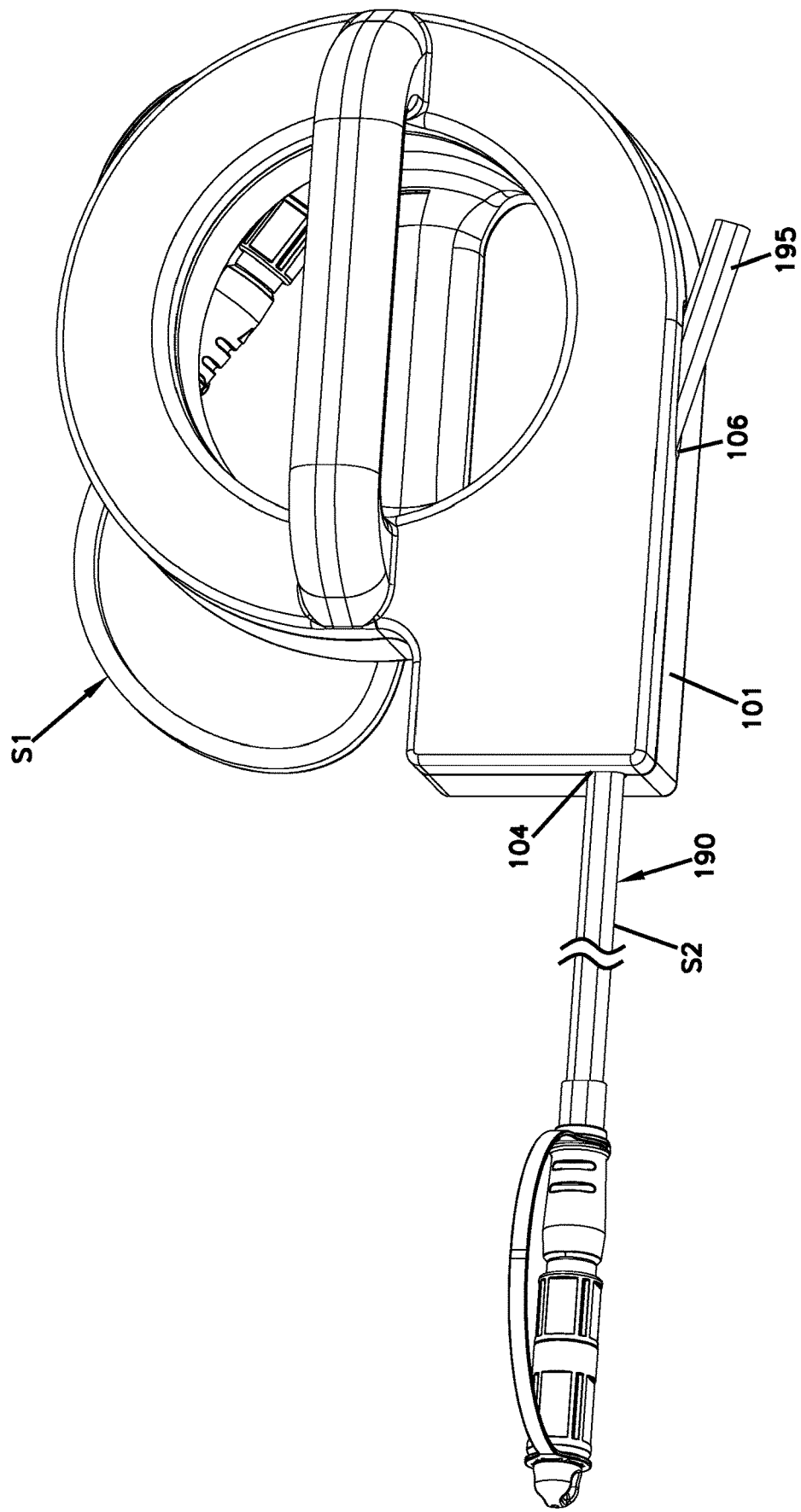
FIG. 3 is a second side perspective view of the cable storage device of FIG. 2.

FIG. 2 illustrates a cable storage device 100 configured in accordance with the principles of the present disclosure. The cable storage device 100 is suitable for storing a slack length of a cable 190, which extends between a first axial end 191 and a second axial end 192. The cable 190 includes a signal carrying portion 196 (e.g., an optical fiber, an electrical conductor, a loose tube holding one or more fibers and/or conductors, etc.) surrounded by a jacket 195. The cable 190 also may include one or more strength members 197 (e.g., fiberglass rods, aramid yarn, etc.). In some implementations, the cable 190 is a drop cable, the first axial end 191 is plugged into a drop terminal 14 and the second axial end 192 is routed towards an end subscriber 15. In other implementations, however, the cable 190 can be any desired cable.

In some implementations, each axial end 191, 192 of the cable 190 is terminated by a ruggedized connector 193, 194 or ruggedized adapter. As the terms are used herein, "ruggedized connectors" and "ruggedized adapters" are configured to mate together to form an environmental seal. Ruggedized connectors and/or ruggedized adapters also can include fasteners (e.g., threaded fasteners, bayonet-style fasteners, etc.) for providing robust connector-to connector mechanical connections. Ruggedized connectors can be male connectors or female connectors. Ruggedized adapters can be located on housings, cables, or other structures. Ruggedized connectors can include multi-fiber ferrules including fiber receiving arrangements defining a plurality of fiber receiving positions. In certain examples, the fiber receiving positions can be arranged in one or more rows of sequential fiber positions. Some non-limiting example ruggedized optical connector interfaces suitable for use with an indexing terminal 35 are disclosed in U.S. Pat. Nos. 7,264, 402, 7,744,288, 7,762,726, 7,744,286, 7,942,590, and 7,959, 361, the disclosures of which are hereby incorporated herein by reference.

The cable storage device 100 includes a main housing 101 defining a first cable port 102, a second cable port 104, and an exit aperture 106. In general, the slack length of the cable 190 is stored within an interior of the main housing 101. The first axial end 191 and second axial end 192 of the cable 190 remain external of the main housing 101. A first segment S1 of the cable 190 extends from the first axial end 191 into the main housing 101 through the first cable port 102. A second segment S2 of the cable 190 extends from the second axial end 192 into the main housing 101 through the second cable port 104. Prior to cable deployment, an initial segment of the cable 190 extends between the first and second segments S1, S2.

Figure 4:
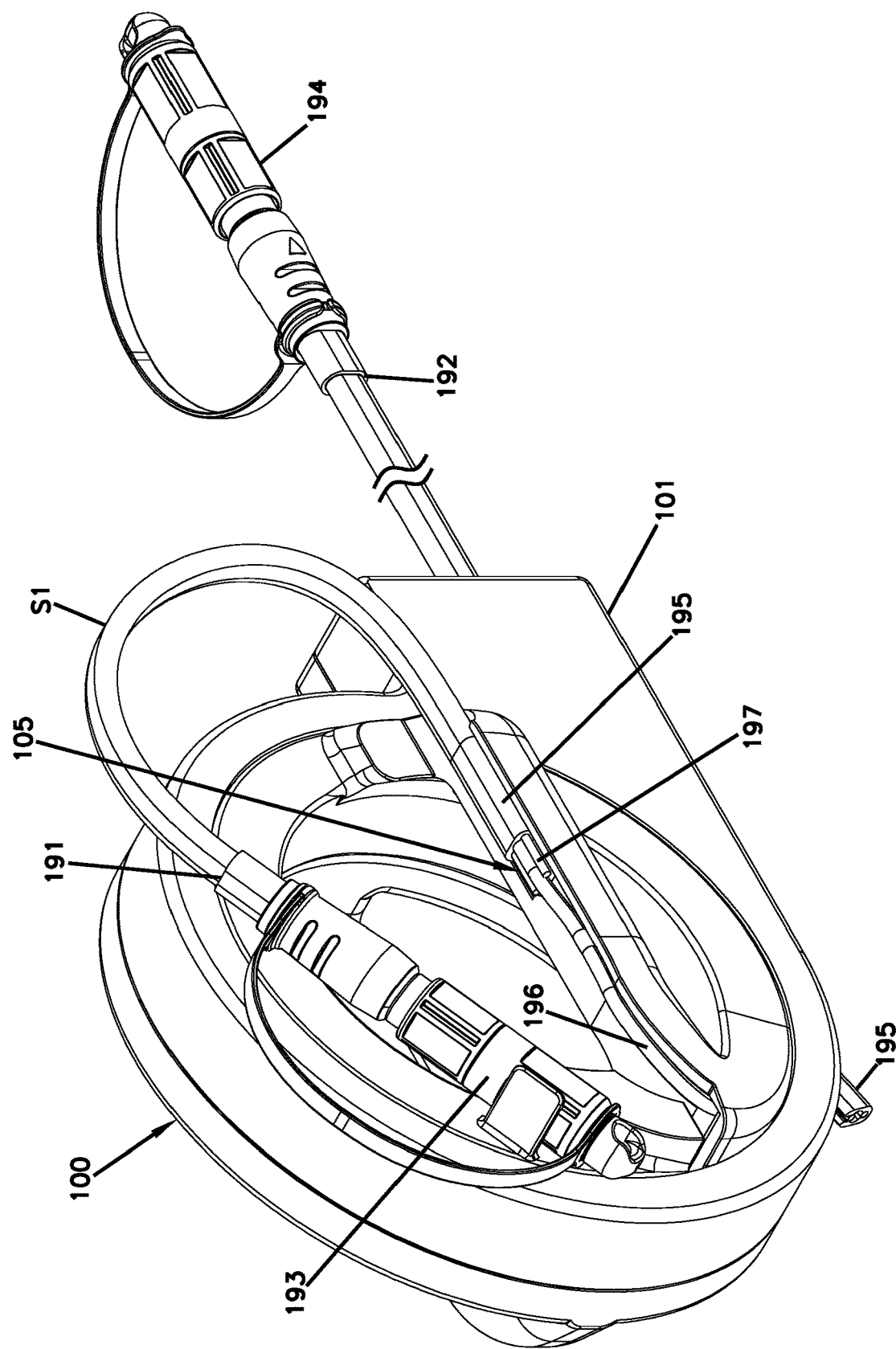
FIG. 4 is a first side perspective view of the cable storage device of FIG. 1 with a handle cover removed for ease in viewing an unjacketed portion of the cable extending from a first cable port into the cable storage device.
Figure 5:
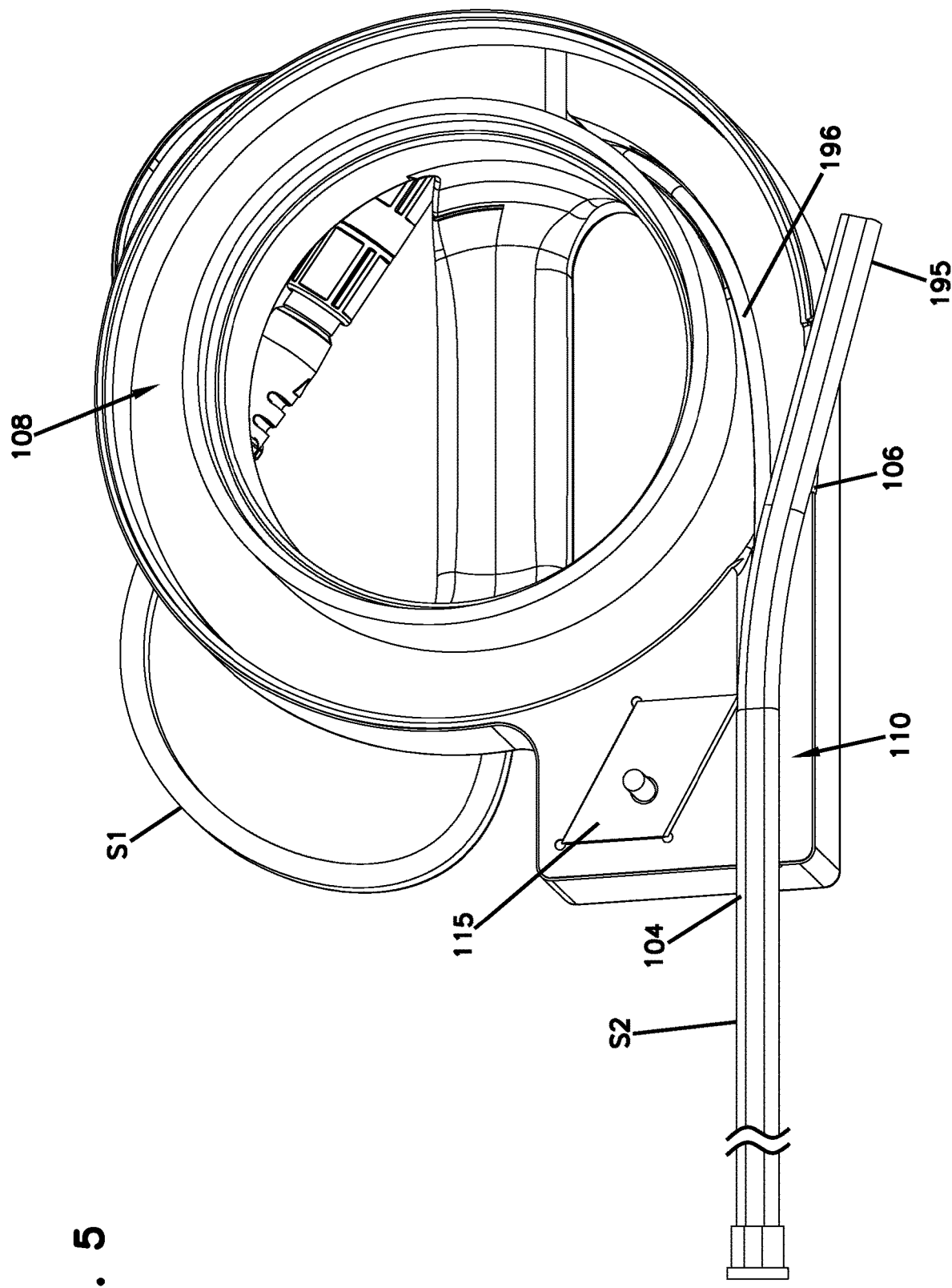
FIG. 5 is a second side perspective view of the cable storage device of FIG. 1 with part of the main housing removed for ease in viewing an interior of the cable storage device.
Figure 6:
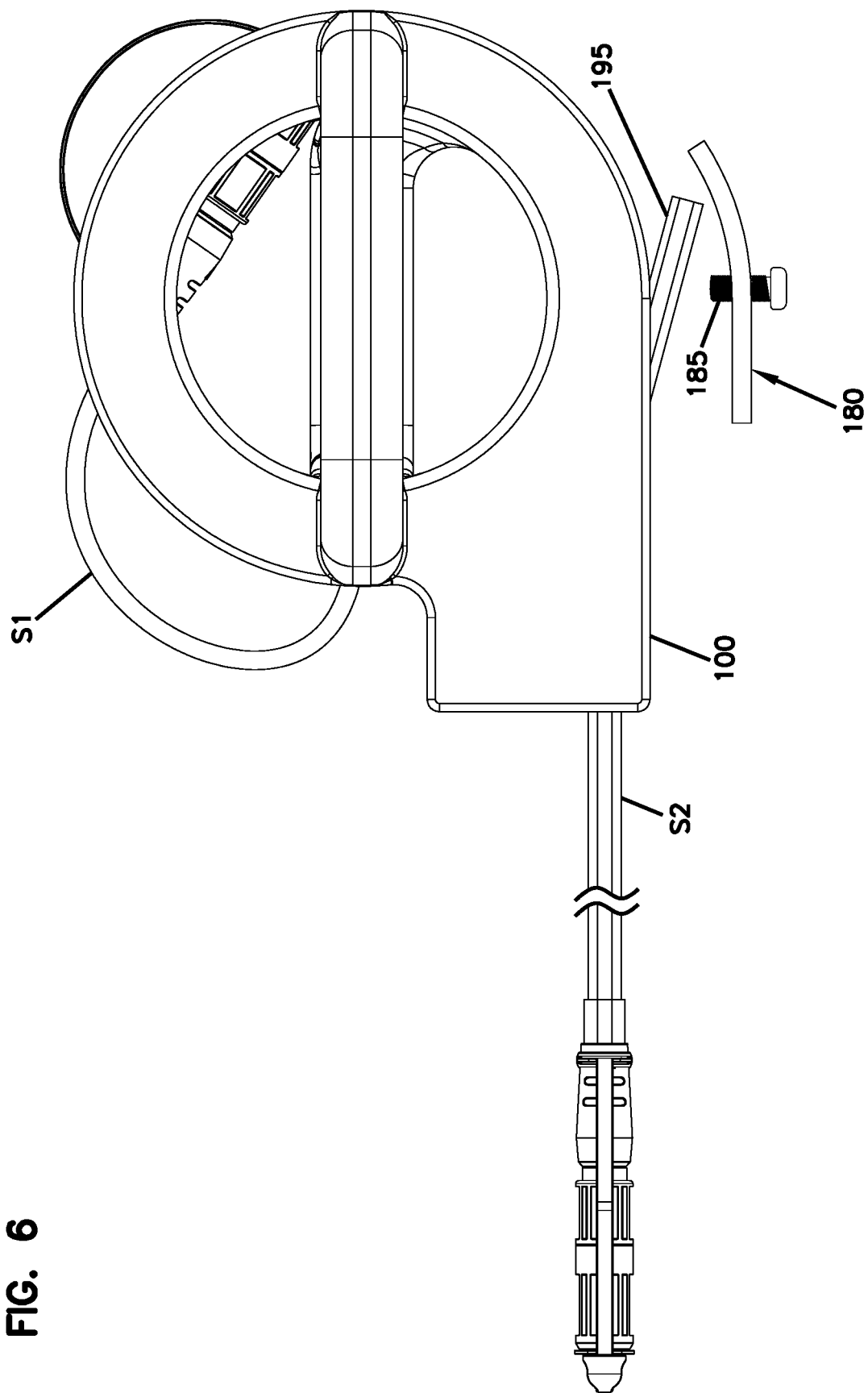
FIG. 6 is a second side view of the cable storage device with a closing member exploded away from the main housing of the cable storage device.

As shown in FIGS. 4 and 5, the jacket 195 and/or strength members 197 are separated from the signal-carrying portion 196 along the initial segment of the cable 190 to form an unjacketed portion of the cable 190 prior to taking-up the slack length. The unjacketed portion of the cable 190 is routed through the cable storage device 100 prior to taking up the slack length of the cable 190. In certain implementations, the unjacketed portion of the cable 190 is routed through the cable storage device 100 prior to deployment of the cable 190 in the field. The slack length of the cable 190 is subsequently taken up during or after deployment of the cable 190 in the field.

When the slack length of the cable 190 is taken-up by the cable storage device 100, at least the signal-carrying portion 196 is stored within the main housing 101 of the cable storage device 100. Within the main housing 101, a bulkier or less flexible component of the cable 190 is removed from the signal-carrying portion 196 of the cable 190 along the slack length of the cable 190 to enable the signal-carrying portion 196 to be stored independent of the bulkier or less flexible component. For example, in some implementations, the signal-carrying portion 196 of the cable 190 is separated from the jacket 195 of the cable 190. The separated jacket 195 can be discarded. In certain implementations, the signal-carrying portion 196 of the cable 190 is separated from the strength members 197 of the cable 190. The separated strength members 197 can be discarded. In certain implementations, the signal-carrying portion 196 is separated from both the jacket 195 and the strength members 197. Removing the bulkier or less flexible components allows the signal-carrying portion 196 of the cable 190 to be stored more compactly (e.g., in a smaller diameter winding) than the full cable 190 otherwise could have been stored.

As shown in FIG. 4, the main housing 101 defines a first transition region 105 at which the unjacketed portion of the cable 190 transitions to the first segment S1 of the cable 190. The jacket 195 of the first segment S1 terminates at the first transition region 105. In certain implementations, the first segment S1 of the cable 190 is retained at the first transition region 105 so that the jacket 195 of the cable 190 does not pull out the cable storage device 100 through the first cable port 102. In certain examples, the jacket 195 of the first segment S1 is retained at the first transition region 105. In certain examples, the strength member(s) 197 of the first segment S1 are retained at the first transition region 105. In certain examples, both the jacket 195 and the strength member(s) 197 are retained at the first transition region 105.

In certain implementations, an environmental seal is provided between the first segment S1 of the cable 190 and the main housing 101 at the first transition region 105. In certain examples, a gasket (e.g., rubber, gel, foam, etc.) is disposed at the first transition region. In certain examples, the first segment S1 is epoxied to the main housing with a water-resistant or water-proof adhesive at the first transition region 105.

As shown in FIG. 5, the second cable segment S2 extends into the main housing 101 at the second cable port 104. A channel 111 directs the second cable segment S2 from the second cable port 104 to the removal station 110 at which the second cable segment S2 transitions into the unjacketed portion of the cable 190. At least the jacket 195 of the cable 190 is cut at the removal station 110 so that one or more cable components can be removed from the jacket 195. In the example shown, a loose tube 198 holding a signal-carrying portion 196 of the cable 190 extends out of the cut jacket 195.

The loose tube 198 and/or signal-carrying portion 196 are directed from the removal station 110 to a storage region 108. In certain implementations, the loose tube 198 and/or signal-carrying portion 196 are stored in a loop at the storage region 108. In certain examples, the loose tube 198 and/or signal-carrying portion 196 are wound around a storage spool at the storage region 108. In certain examples, winding the loose tube 198 and/or signal-carrying portion 196 around the spool advances the second cable segment S2 through the second cable port 104 and into the main housing 101.

The jacket 195 separated from the unjacketed portion of the cable 190 extends out of the main housing 101 through the exit aperture 106. For example, the user may initial route the jacket 195 through the exit aperture 106 when the unjacketed portion of the cable 190 is routed through the cable storage device 100. In some implementations, the exit aperture 106 is generally coaxial with the second cable port 104 (e.g., see FIG. 9). In other implementations, the exit aperture 106 faces away from the storage spool 120 out of alignment with the second cable port 104 (e.g., see FIG. 2). In certain examples, winding the unjacketed portion of the cable 190 at the storage spool advances the jacket 195 through the exit aperture 106.

In certain implementations, taking up the slack length of the cable 190 changes the length of the second cable segment S2 while not changing the length of the first cable segment S1. In certain examples, the first segment S1 is shorter than the second segment S2 even before the slack length is taken up by the cable storage device 100. In some implementations, the first segment S1 is sufficiently short that the cable storage device 100 can be stored at the same location as the first axial end 191 of the cable 190 as will be described in more detail herein. In other implementations, the first segment S1 is sufficiently long that the cable storage device 100 is stored remote from the location at which the first axial end 191 of the cable 190 is stored/connected.

When a desired amount of cable slack is held at the storage region 108, the jacket 195 is cut at the exit aperture 106. A closing member 180 can be mounted to the main housing 101 to cover the exit aperture 106. For example, the closure member 180 can be fastened to the main housing 101. In other examples, the closure member 180 can be latched, welded, glued, or otherwise secured to the main housing 101.

In certain implementations, the closing member 180 axially retains the jacket 195 at the main housing 101. Retaining the jacket 195 inhibits axially pull-out of the second cable segment S2 from the main housing 101. In certain examples, the closing member 180 can include a retention member 185 that engages the jacket 195 at or adjacent the exit aperture 106. For example, the retention member 185 can include a screw carried by the closing member 180. The screw 185 can thread into the jacket 195 and into the main housing 101 to axially retain the jacket 195 at the main housing 101. In other examples, the retention member 185 can include a clamp, an adhesive section, or other retention structure.

In certain implementations, the closing member 180 environmentally seals the main housing 101 at the exit aperture 106. Accordingly, mounting the closing member 180 to the main housing 101 environmentally seals the unjacketed portion of the cable 190 stored within the cable storage device 100. For example, a gasket (e.g., gel, foam, rubber, etc.) can be disposed on the closing member 180 to engage an exterior of the main housing 101 when the closing member 180 is mounted to the main housing 101.

Figure 7:
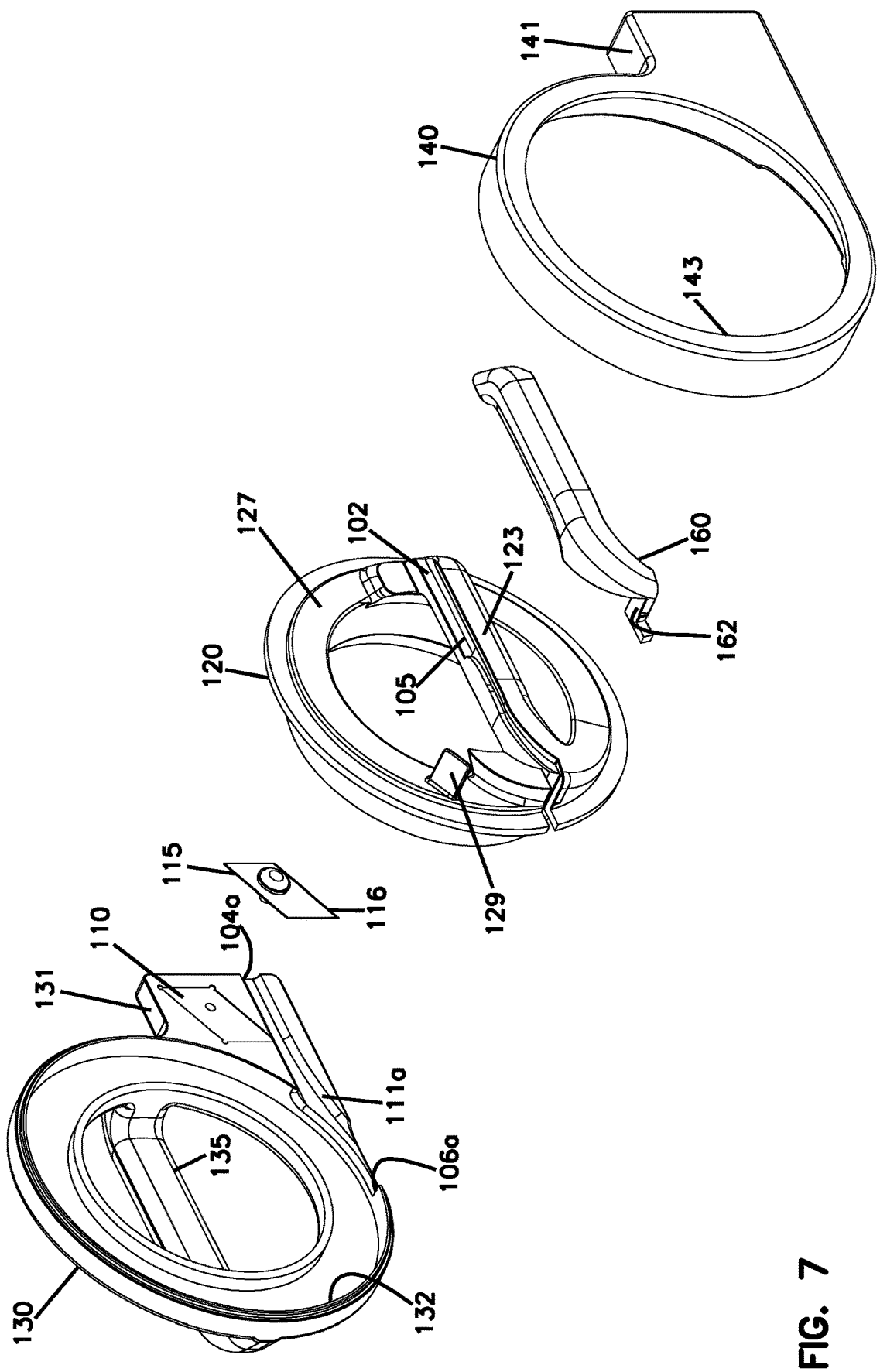
FIG. 7 is a second side perspective view of the cable storage device of FIG. 1 with the components exploded out from each other.
Figure 8:
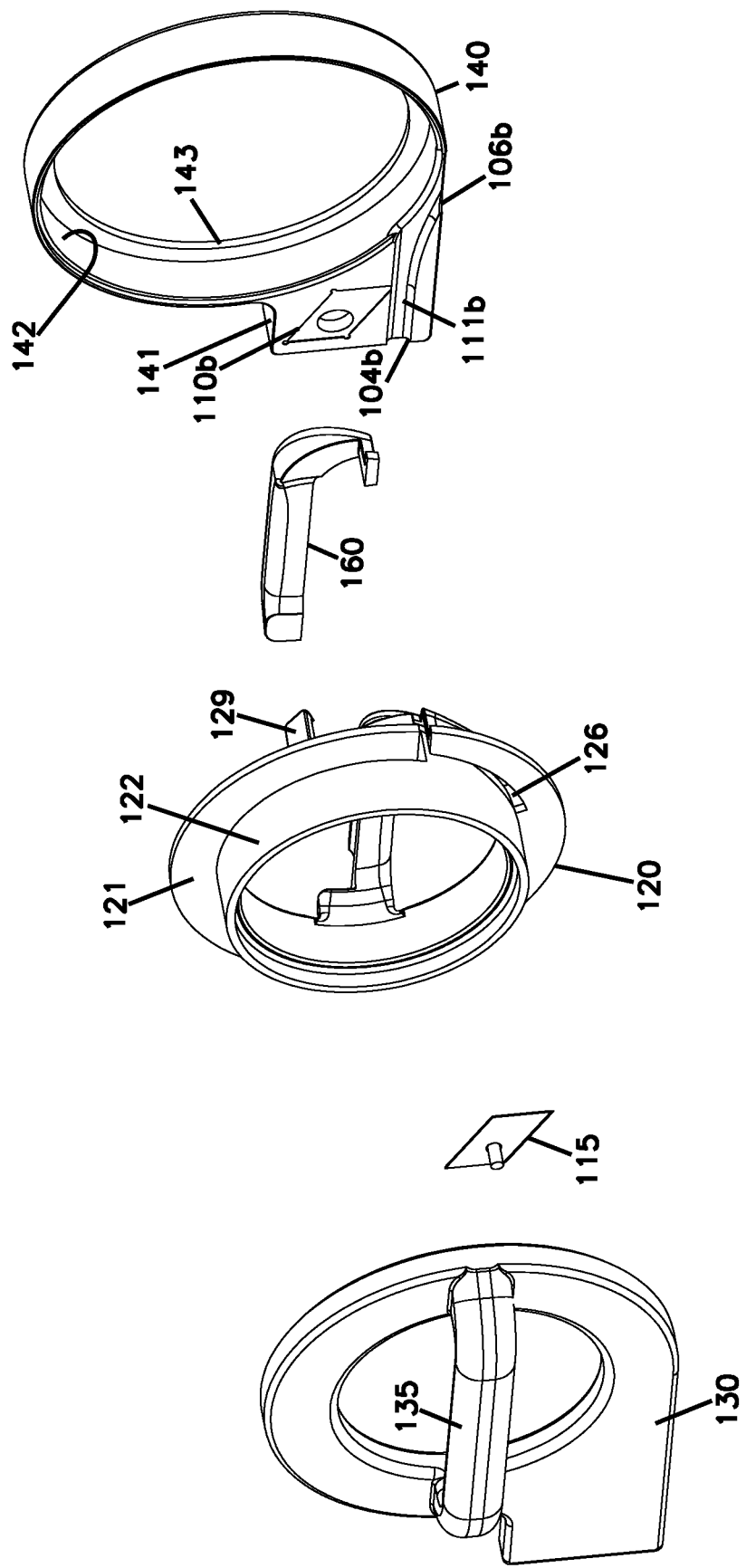
FIG. 8 is a first side perspective view of the cable storage device of FIG. 7.

FIGS. 7-8 illustrate an example implementation of the cable storage device 100. In some implementations, the cable storage device 100 includes a storage spool 120 that is rotatable relative to the main housing 101. In certain implementations, the main housing 101 includes a first housing member 130 and a second housing member 140 that hold the storage spool 120 therebetween. In certain implementations, the first and second housing members 130, 140 cooperate to define the removal station 110 and the channel 111. In certain implementations, the first and second housing members 130, 140 cooperate to hold a cutting tool 115 at the removal station 110.

In some implementations, the first housing member 130 has a first side and an opposite second side and includes a first portion 131 and a round portion 132. The first side of the first portion 131 includes a groove 111a that forms part of the channel 111. The first side of the first portion 131 also may include a recessed portion 110a at which at least part of the cutting tool 115 can be disposed. The groove 111a extends between a first end 104a, which forms part of the second cable port 104, and a second end 111a, which forms part of the exit aperture 106. The groove 111a is open to an interior of the round portion 132. A handle 135 extends outwardly from the second side of the first housing member 130. In certain implementations, the handle 135 extends across the round portion 132.

In some implementations, the second housing member 140 has a first side and an opposite second side and includes a first portion 141 and a round portion 142. The second side of the first portion 141 includes a groove 111b that forms part of the channel 111. The second side of the first portion 141 also may include a recessed portion 110b at which at least part of the cutting tool 115 can be disposed. The groove 111b extends between a first end 104b, which forms part of the second cable port 104, and a second end 111b, which forms part of the exit aperture 106. The groove 111b is open to an interior of the round portion 142. The round portion 142 of the second housing member 140 defines an aperture 143 through which an exterior of the storage spool 120 is accessible.

Figure 9:
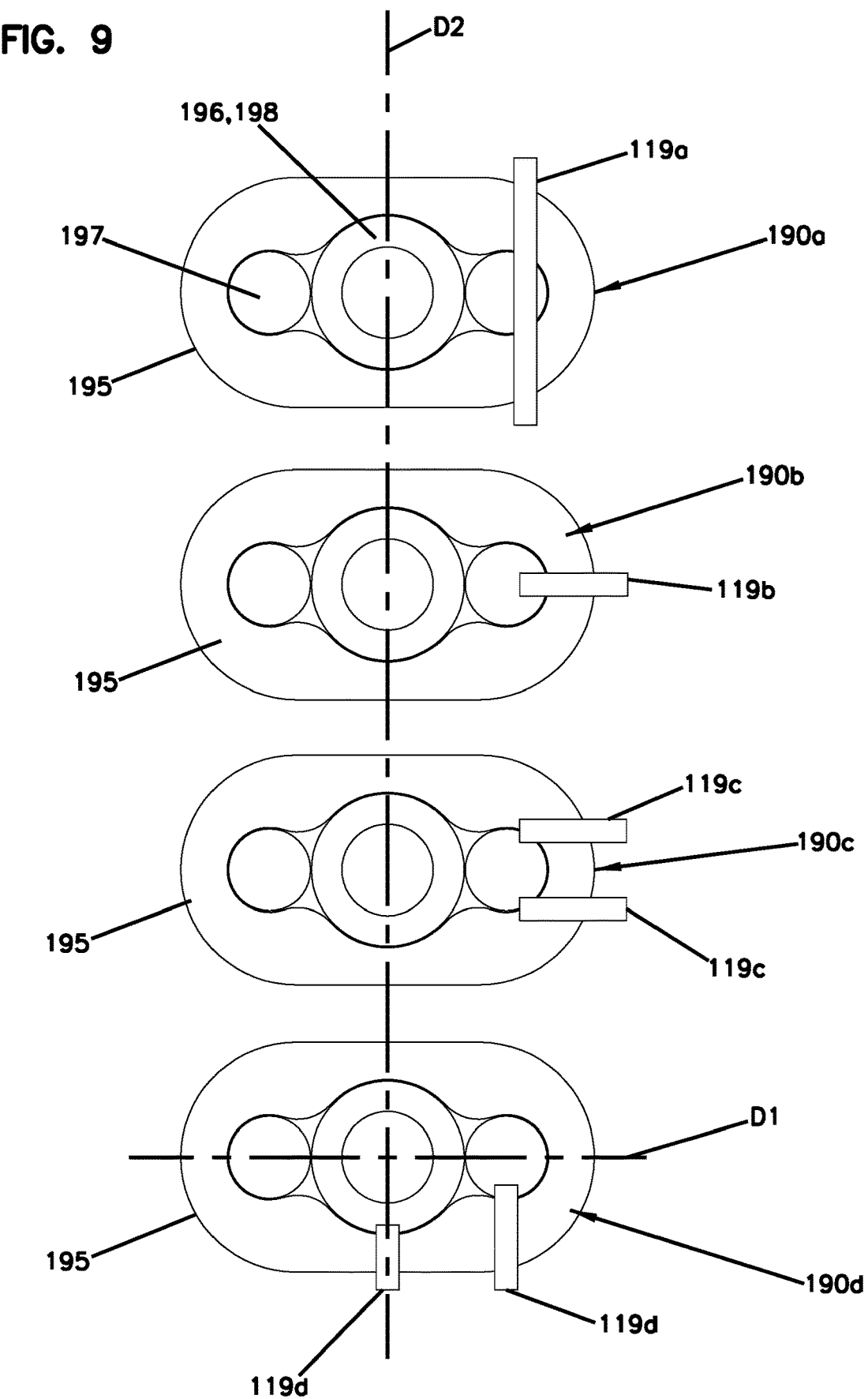
FIG. 9 illustrates various types of cuts that can be made in the jackets of an example cable.

A cutting tool 115 is disposed at the removal station 110. In some implementations, the cutting tool 115 includes a stationary blade 116 along which the jacket 195 slides as the cable 190 is advanced through the cable storage device 100. The blade 116 slits the cable jacket 195 as the cable 190 is advanced. In some examples, the cable 190 is an oblong shape having a major diameter D1 and a minor diameter D2. For example, FIG. 9 shows four such cables 190a-190d. In the example cable 190a, the blade 116 slits the cable jacket 195 parallel to the minor diameter D2 in line with one of the strength members 197. In another example, the slot could be made in line with the minor diameter D2. In the example cable 190b, the blade 116 slits the cable jacket 195 parallel to the major diameter D1. In the example cable 190c, double blades slit the cable jacket 195 at opposite sides of the major diameter to create a larger window through which the internal components can be extracted from the jacket 195. In the example cable 190d, double blades slit the cable jacket 195 to create a larger window along the major diameter D1 of the cable 190d through which the internal components can be extracted from the jacket 195. In other implementations, the cutting tool 115 includes a rotating blade.

Figure 10:
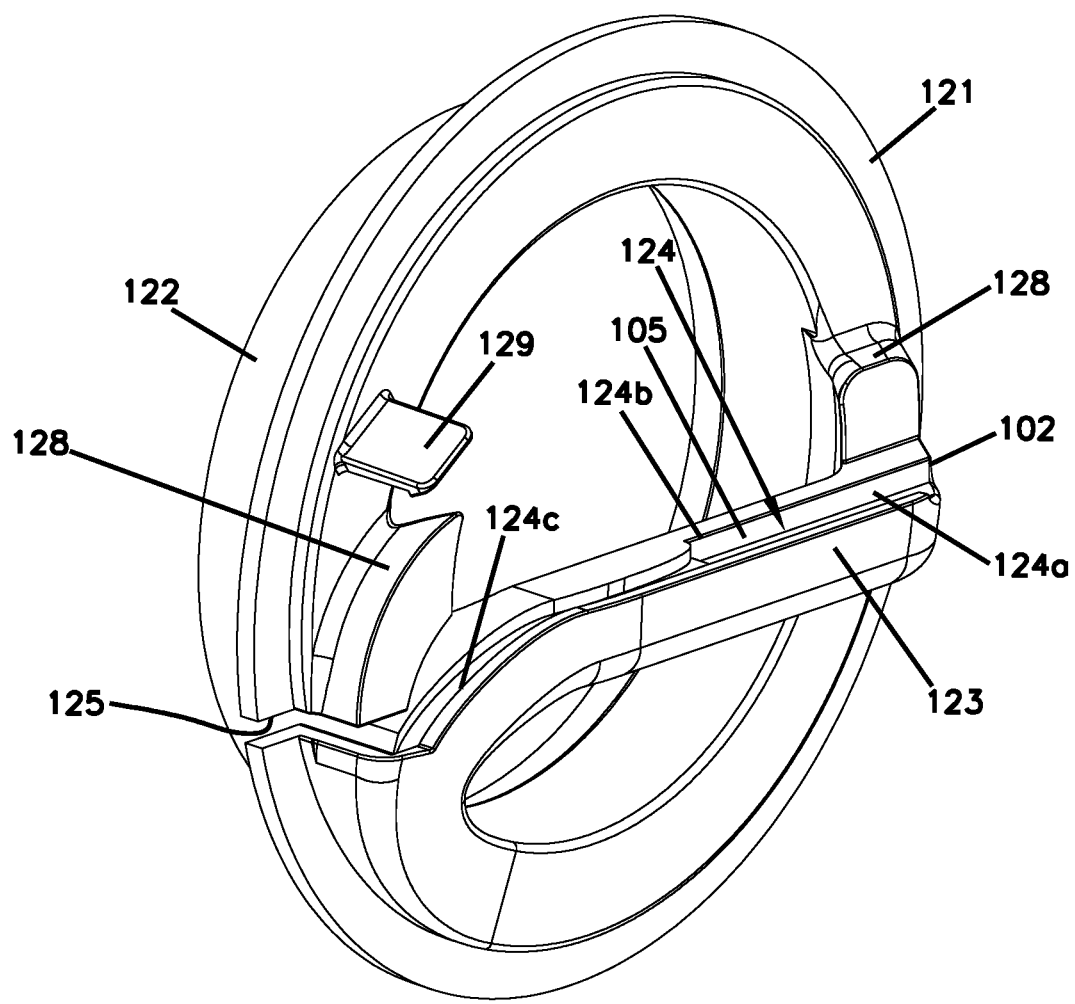
FIG. 10 is a first side perspective view of an example cable storage spool suitable for use with the cable storage device of FIG. 1.
Figure 11:
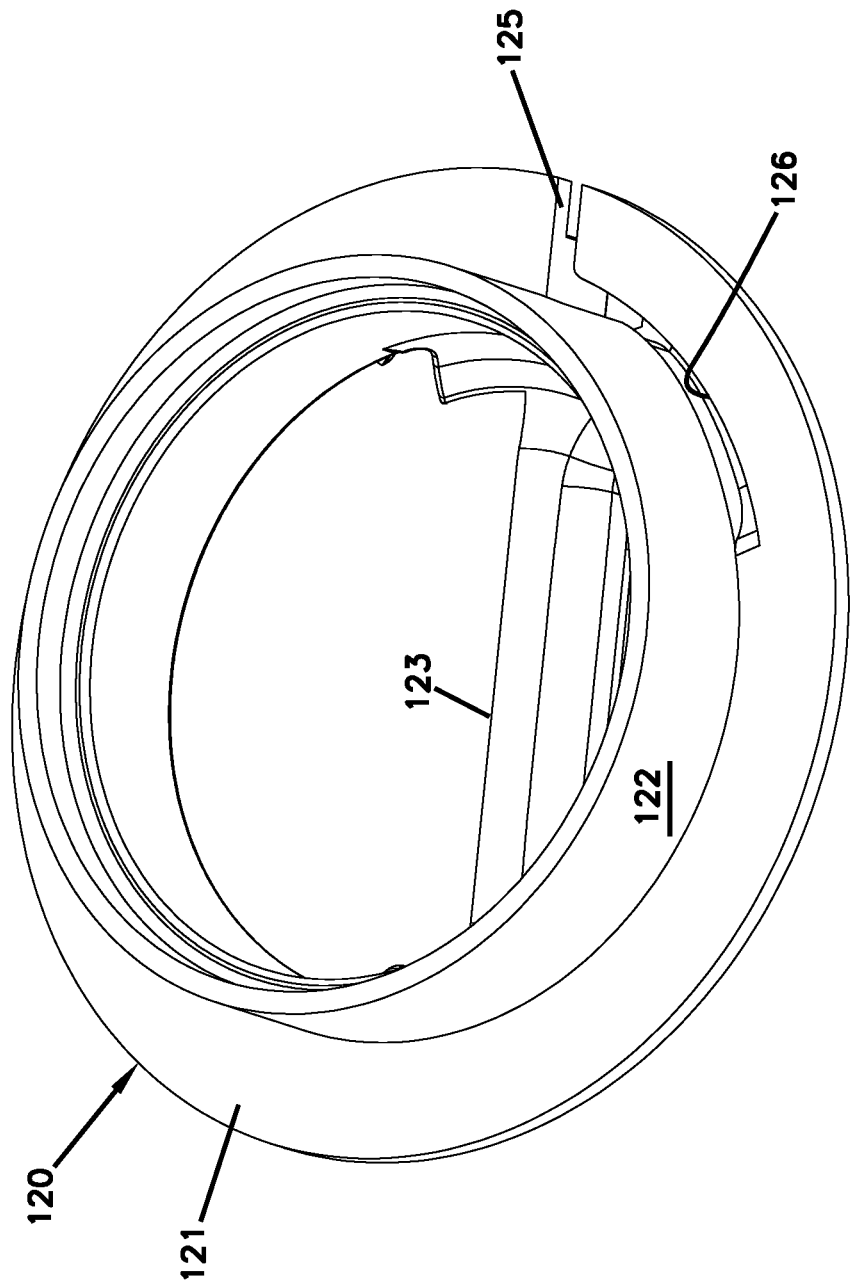
FIG. 11 is a second side perspective view of the example cable storage spool of FIG. 10.

FIGS. 10-11 illustrate one example storage spool 120 suitable for use in any of the cable storage devices 100, 200, 201, 202, 203 described herein. The storage spool 120 includes a drum 122 having an annular surface facing radially outwardly. In certain implementations, the drum 122 is sized so that optical fiber wound around the drum 122 is not bent beyond a bend radius limit of the fiber. A flange 121 extends radially outwardly from the drum 122. At least the flange 121 is configured to be captured between the first and second housing members 130, 140 so that the storage spool 120 is carried by the main housing 101.

The storage spool 120 cooperates with the first housing member 130 to define the storage region 108. In particular, the storage region 108 extends radially from the drum outer annular surface to an inner annular surface of the round portion 132 of the first housing member 130.

In some implementations, the storage spool 120 includes a handle 123 by which a user can rotate the storage spool 120 relative to the main housing 101. For example, the user may grasp the handle 135 of the first housing member 130 in one hand and the handle 123 of the storage spool 120 in the other to rotate the spool 120 relative to the main housing 101. Rotating the storage spool 120 relative to the main housing 101 advances the cable 190 as discussed herein. In other implementations, one of the main housing 101 and the storage spool 120 includes a keying structure instead of a handle. In such implementations, a tool (e.g., a drill-type tool) can be fitted to the keying structure and activated to rotate the storage spool 120 relative to the main housing 120.

In certain implementations, a portion of the storage spool 120 extends outwardly through the aperture 143 of the second housing member 140. In some examples, the handle 123 extends through the aperture 143. In other examples, the handle 123 is disposed external of the main housing 101. In certain examples, the storage spool 120 has a raised section 127 that extends axially outwardly from the flange 121 to fit within the aperture 143 of the second housing member 140. The raised portion 127 rotates within the aperture 143.

In some implementations, the first transition region 105 is located on the handle 123 (see FIG. 11) of the storage spool 120. For example, a channel 124 extends from the first cable port 102, along the handle 123, through a slot 125 in the flange 121, to an opposite side of the storage spool 120. The channel 124 has a first section 124a at the first cable port 102 that is sufficiently wide to receive the jacketed cable segment S1. The channel 124 has a second section 124c that extends from the first section 124a to the slot 125. The second section 124c is too narrow to receive a jacketed portion of the cable 190. Rather, the second section 124c is sized to receive a loose tube 198 and/or signal carrying portion 196 of the cable 190. In certain examples, the first section 124a transitions to the second section 124c at a shoulder 124b against which the jacket 195 of the first cable segment S1 abuts.

As shown in FIG. 11, the slot 125 in the flange 121 allows the loose tube 198 and/or signal carrying portion 196 of the cable 190 to pass from one side of the flange 121 to the other. A ramped surface 126 leads the loose tube 198 and/or signal carrying portion 196 of the cable 190 from the slot 125 to the drum 122.

As shown in FIGS. 7-8, a handle cover 160 mounts to the handle 123 to cover the channel 124. Accordingly, the handle cover 160 cooperates with the storage spool 120 and housing members 130, 140 to enclose the unjacketed portion of the cable 190. In certain implementations, the handle cover 160 includes a filler portion 162 sized and shaped to fit over the slot 125 defined in the flange 121. Accordingly, the unjacketed portion of the cable 190 is not accessible from an exterior of the cable storage device 100 when the cable storage device 100 is assembled with storage spool 120 held by the main housing 101 and the handle cover 160 mounted to the handle 123.

In certain implementations, the handle cover 160 aids in retaining the first cable segment S1 at the first transition region 105. For example, the handle cover 160 can cooperate with the handle 123 to clamp the jacketed first cable segment S1, can carry a fastener that extends through the first cable segment S1, or can cooperate with the handle 123 to hold adhesive about the first cable segment S1. In certain implementations, the handle cover 160 environmentally seals the first cable port 102.

In the example shown, the storage spool 120 includes support structures 128 disposed at opposite ends of the handle 123. In certain examples, the handle cover 160 seats on the support structures 128.

The first cable segment S1 is retained at the first transition region 105. Accordingly, the first cable segment S1 rotates with the cable spool 120. In certain implementations, the storage spool 120 includes a mounting station at which the first end 191 of the cable is held stationary relative to the storage spool 120. In certain examples, the mounting station is configured to receive the connector 193 terminating the first end 191 of the cable 190. In the example shown, the mounting station is provided at the same side of the storage spool 120 as the handle 123. The mounting station is spaced from the first cable port 102 so that the first cable segment S1 extends between the first cable port 102 and the mounting station when the connector 193 is received at the mounting station. Accordingly, when the connector 193 can be disconnected from the mounting station, the first segment S1 provides some flexibility in positioning and orienting the connector 193 to facilitate making a connection.

In the example shown, the mounting station includes a latching tab 129 that snaps over the connector 193 when the connector 193 is positioned at the mounting station. In certain implementations, the latching tab 129 is spaced from the handle cover 160 a distance sufficient to accommodate the connector 193. In such implementations, the latching tab 129 holds the connector 193 to the handle cover 160.

Figure 12:
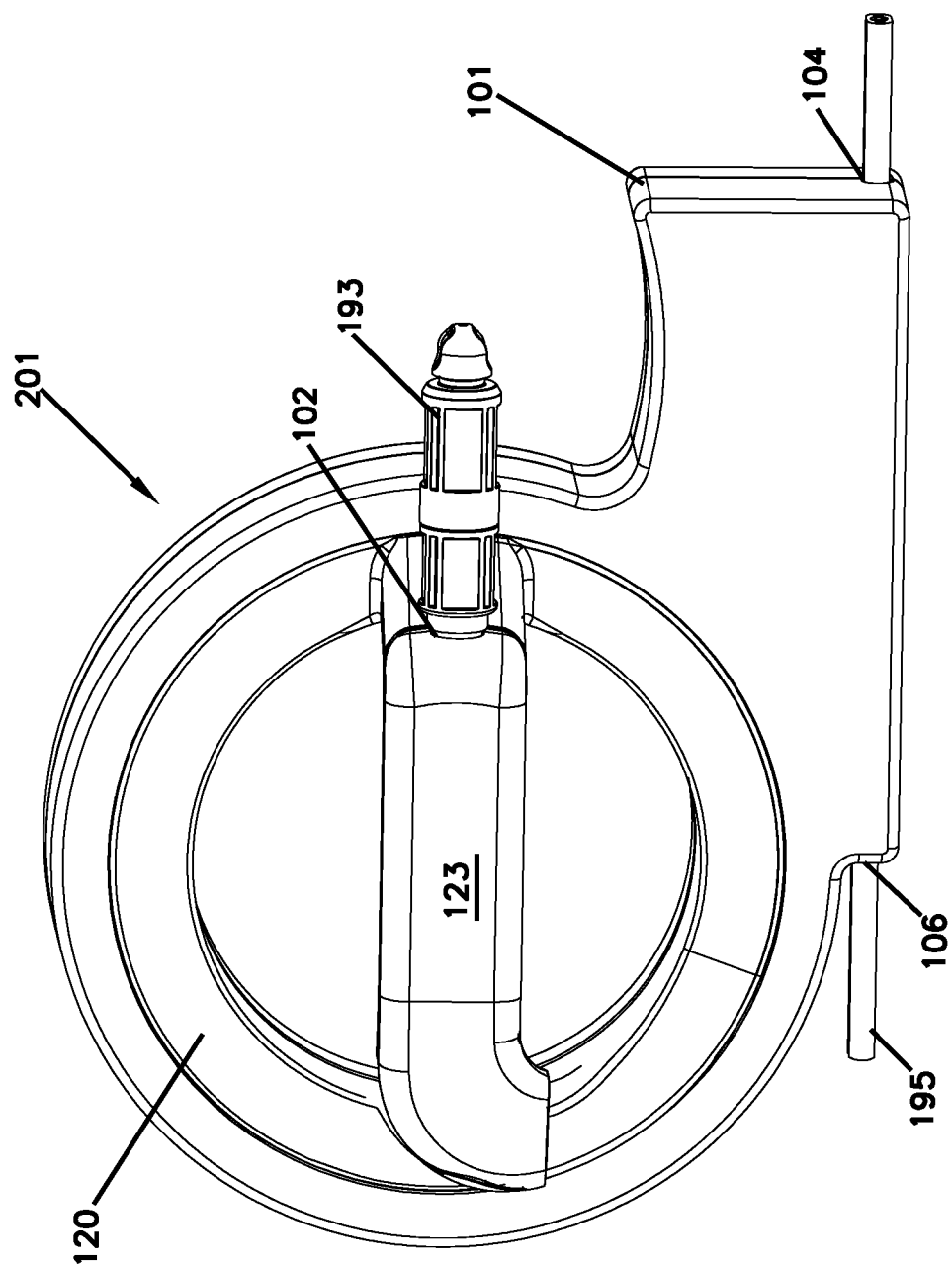
FIG. 12 is a perspective view of an alternative cable storage device including an exit aperture aligned with the second cable port.

FIG. 12 illustrates an alternative implementation of a cable storage device 201 that is substantially the same as the cable storage device 100 described above, except where otherwise indicated. The cable storage device 201 does not include a mounting station. Rather, the connector 193 terminating the first axial end 191 of the cable 190 is disposed at the first cable port 102. In some such implementations, the first connector 193 is not movable relative to the cable storage device 201 to make a connection.

In certain implementations, the first cable port 104 of a cable storage device 100, 200, 201, 202, 203 may axially align with the exit aperture 106. One example of such an alignment is shown in the cable storage device 201 of FIG. 12. This alignment may facilitate routing the jacket 195 and/or strength members 197 through the cable storage device 201. For example, this alignment reduces bending of the jacket 195 and/or strength members 197 within the storage device 201. This reduction in bending may facilitate winding of the storage spool 120 by reducing the amount of force needed to advance the cable 190.

Figure 13:
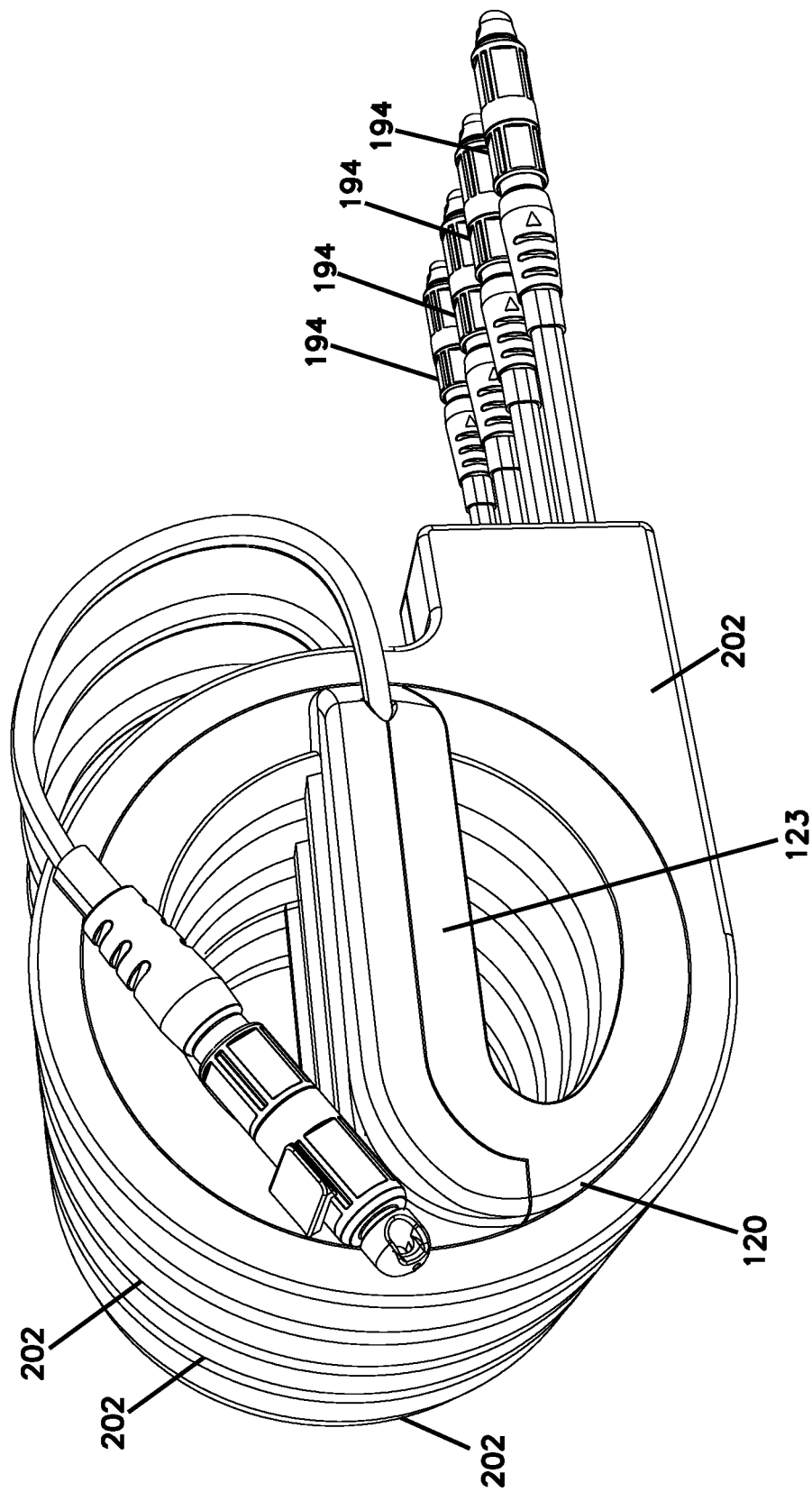
FIG. 13 illustrates stackable cable storage devices.

FIG. 13 illustrates an alternative implementation of the cable storage device 202 that is substantially the same as the cable storage device 100 described above, except where otherwise indicated. The cable storage device 202 has a main housing 101 configured to enable stacking of multiple cable storage devices 202. For example, the first housing member 130 of a first cable storage device 202 can be configured to receive the handle 123 of the storage spool 120 of a second cable storage device 202. Stacking the cable storage devices 202 can facilitate storing slack length of multiple cables routed to a building (e.g., a multi-dwelling unit, a business, etc.). Stacking the cable storage devices 202 also can facilitate storing the devices 202 prior to deployment of the cables 190.

Figure 14:
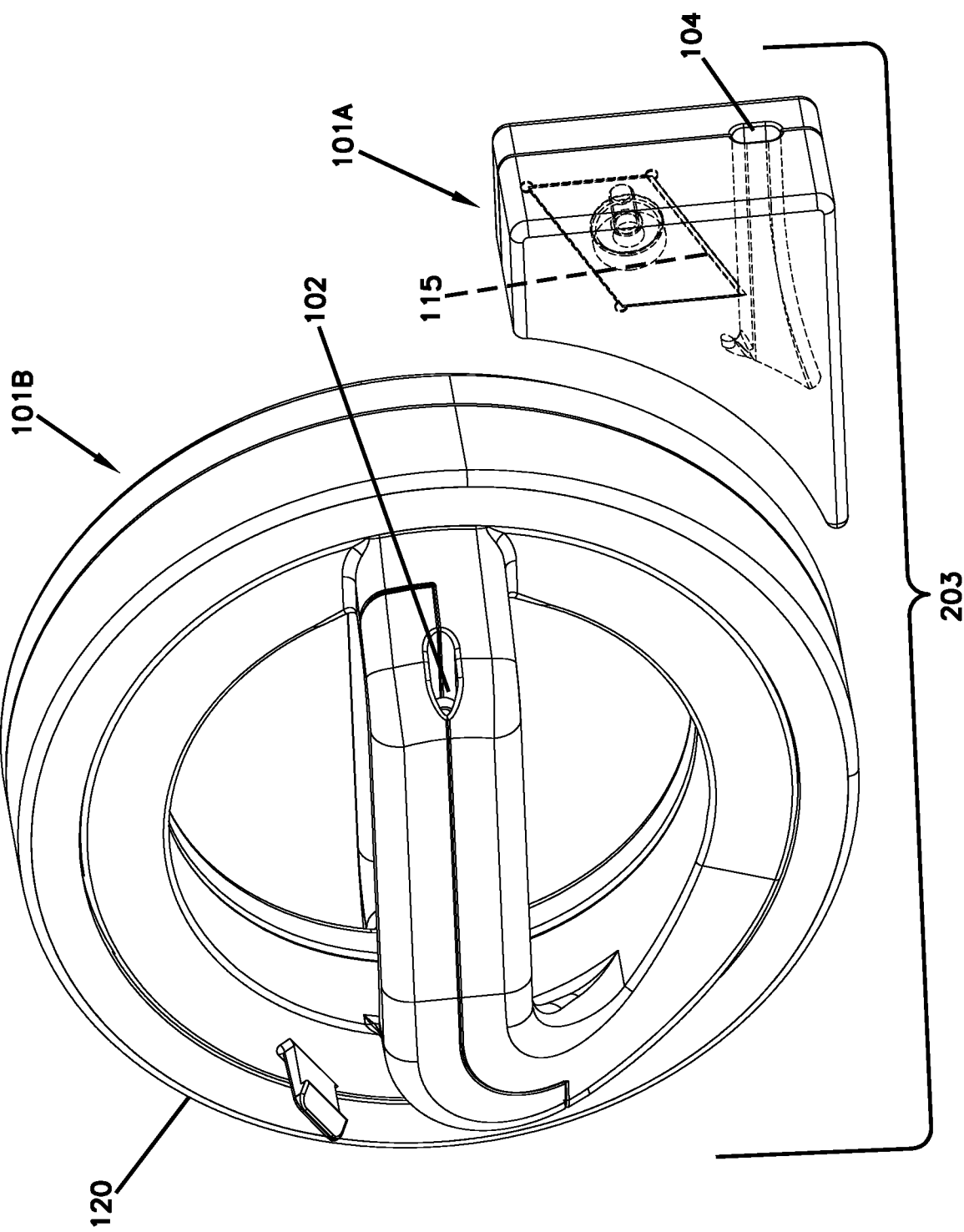
FIG. 14 is a perspective view of an alternative cable storage device including a cutting portion that is removable from the storage portion.
Figure 15:
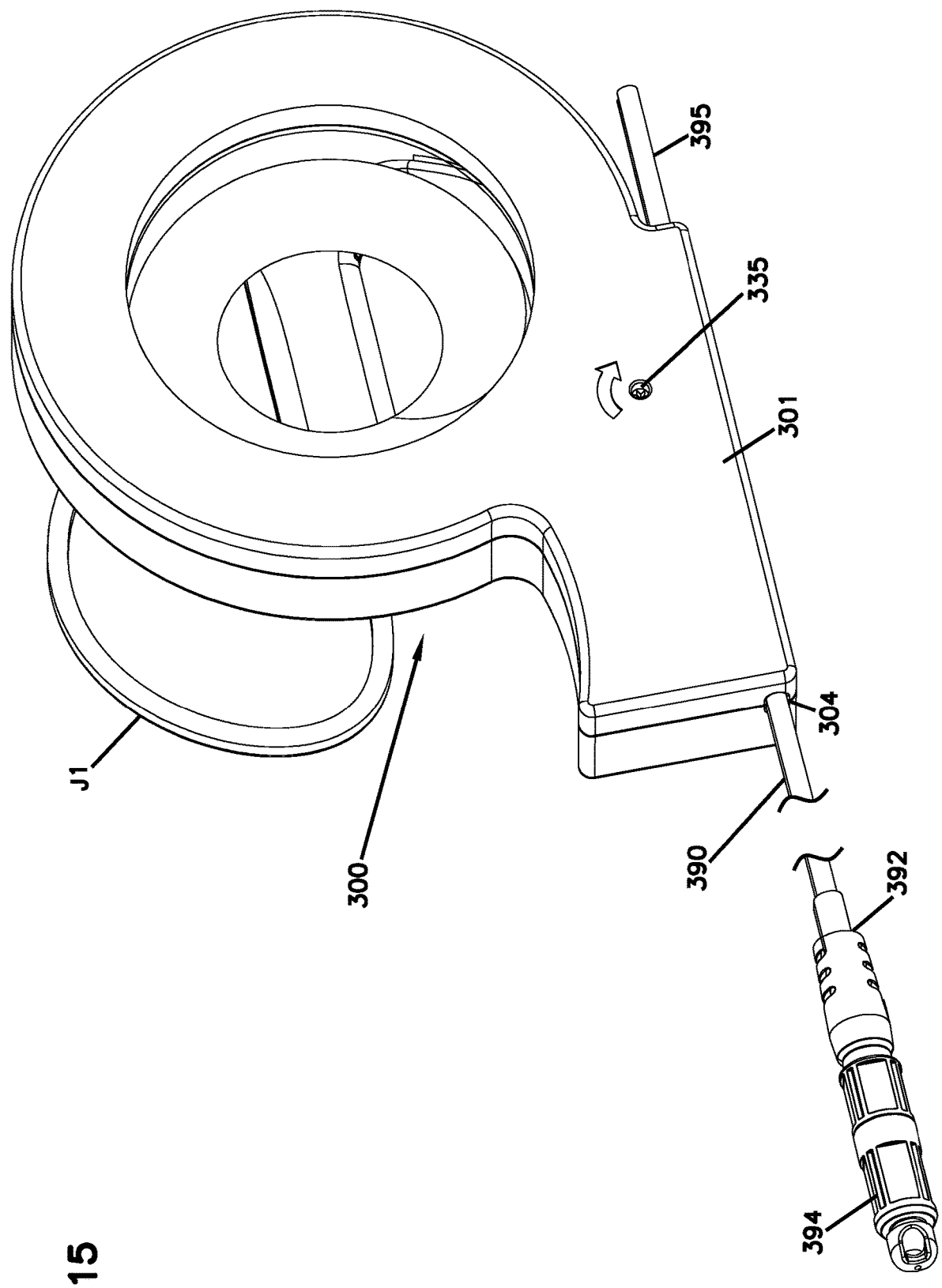
FIG. 15 is a perspective view of another example cable storage device structured and assembled in accordance with the principles of the present disclosure.

FIG. 14 illustrates another alternative implementation of the cable storage device 203 that resembles the cable storage device 100 described above, except where otherwise indicated. The cable storage device 203 includes a stripper portion 101A of the main housing 101 that is removable from a storage portion 101B of the main housing 101. The stripper portion 101A holds the cutting tool 115. The storage portion 101B carries the storage spool 120. The stripper portion 101A attaches to the storage portion 101B when the slack length of the cable 190 is being stored. When the slack length is wound around the storage spool 120, the stripper portion 101A is removed from the storage portion 101B. Accordingly, the stripper portion 101A can be used with the storage portion 101B of another cable 190.

In some implementations, the stripper portion 101A includes first and second housing members that cooperate to hold the cutting tool 115 and define a passage leading from a cable port 104 to the cutting tool 115. The first and second housing members can be assembled around an intermediate portion of a cable. Accordingly, the stripper portion 101A can be assembled over the cable 190 in the field during or after deployment of the cable 190. In various examples, the stripper portion 101A can be latched, fastened, friction-fit, welded, or otherwise coupled to the storage portion 101B.

FIGS. 15-20 illustrate another example cable storage device 300 configured in accordance with the principles of the present disclosure. The cable storage device 300 is suitable for storing a slack length of a cable 390, which extends between a first axial end 391 and a second axial end 392. The cable 390 includes a signal carrying portion 396 (e.g., an optical fiber, an electrical conductor, a loose tube holding one or more fibers and/or conductors, etc.) surrounded by a jacket 395. The cable 390 also may include one or more strength members (e.g., fiberglass rods, aramid yarn, etc.). In some implementations, the cable 390 is a drop cable, the second axial end 392 is plugged into a drop terminal 14 and the first axial end 391 is routed towards an end subscriber 15. In other implementations, however, the cable 390 can be any desired cable. In certain implementations, the axial ends 391, 392 of the cable 390 can be terminated at ruggedized connectors.

Prior to taking-up the slack length of the cable 390, a window is cut in the jacket 395 of the cable 390 so that the cable 390 has a first jacketed portion J1 at the first axial end 391, a second jacketed portion J2 at the second axial end 392, and an unjacketed portion therebetween. In certain examples, the second jacketed portion J2 is substantially longer than the first jacketed portion J1 and the unjacketed portion. The unjacketed portion is initially sized to extend through the main housing 101 from a removal station 310 to a transition region 305, which will be discussed in greater detail herein. In certain implementations, the window is cut and the unjacketed portion of the cable is routed through the main housing in the factory prior to being deployed in the field.

In certain implementations, the jacketed portions J1, J2 of the cable 390 are terminated at connectors (e.g., an optical connector, an electrical connector, etc.). In various examples, the jacketed portions J1, J2 of the cable 390 are each terminated by an SC connector, an LC connector, an LX.5 connector, an multi-termination connector (e.g., MPO connector), a DLX connector, a ruggedized multi-termination connector (e.g., HMFOC connector), etc.

The cable storage device 300 is substantially the same as the cable storage device 100 described above except where otherwise stated. The cable storage device 300 includes a storage spool 320 that is rotatable relative to a main housing 301. In certain implementations, the storage spool 320 includes a handle 323 by which the storage spool 320 is rotated relative to the main housing 301 as will be discussed in more detail herein.

When the slack length of the cable 390 is taken-up by the cable storage device 300, at least the signal-carrying portion 396 is stored on the storage spool 320 within a main housing 301 of the cable storage device 300. For example, in certain implementations, the main housing 301 includes a first housing member 330 and a second housing member 340 that hold the storage spool 320 therebetween (see FIG. 16). In certain implementations, the storage spool 320 includes a drum 322 around which the signal-carrying portion 396 can wind and a flange 321 extending radially outwardly from the drum 322.

Within the main housing 301, a bulkier or less flexible component of the cable 390 is removed from the signal-carrying portion 396 of the cable 390 along the slack length of the cable 390 to enable the signal-carrying portion 396 to be stored independent of the bulkier or less flexible component. For example, in some implementations, the signal-carrying portion 396 of the cable 390 is separated from the jacket 395 of the cable 390 at a removal station 310. The cable 390 enters the main housing 301 of the storage device 300 at the second cable port 304. A channel 311 directs the cable 390 from the second cable port 304 to the removal station 310. In certain implementations, the first and second housing members 330, 340 cooperate to define the removal station 310 and the channel 311. In certain implementations, the first and second housing members 330, 340 cooperate to hold a cutting tool 315 at the removal station 310.

Figure 16:
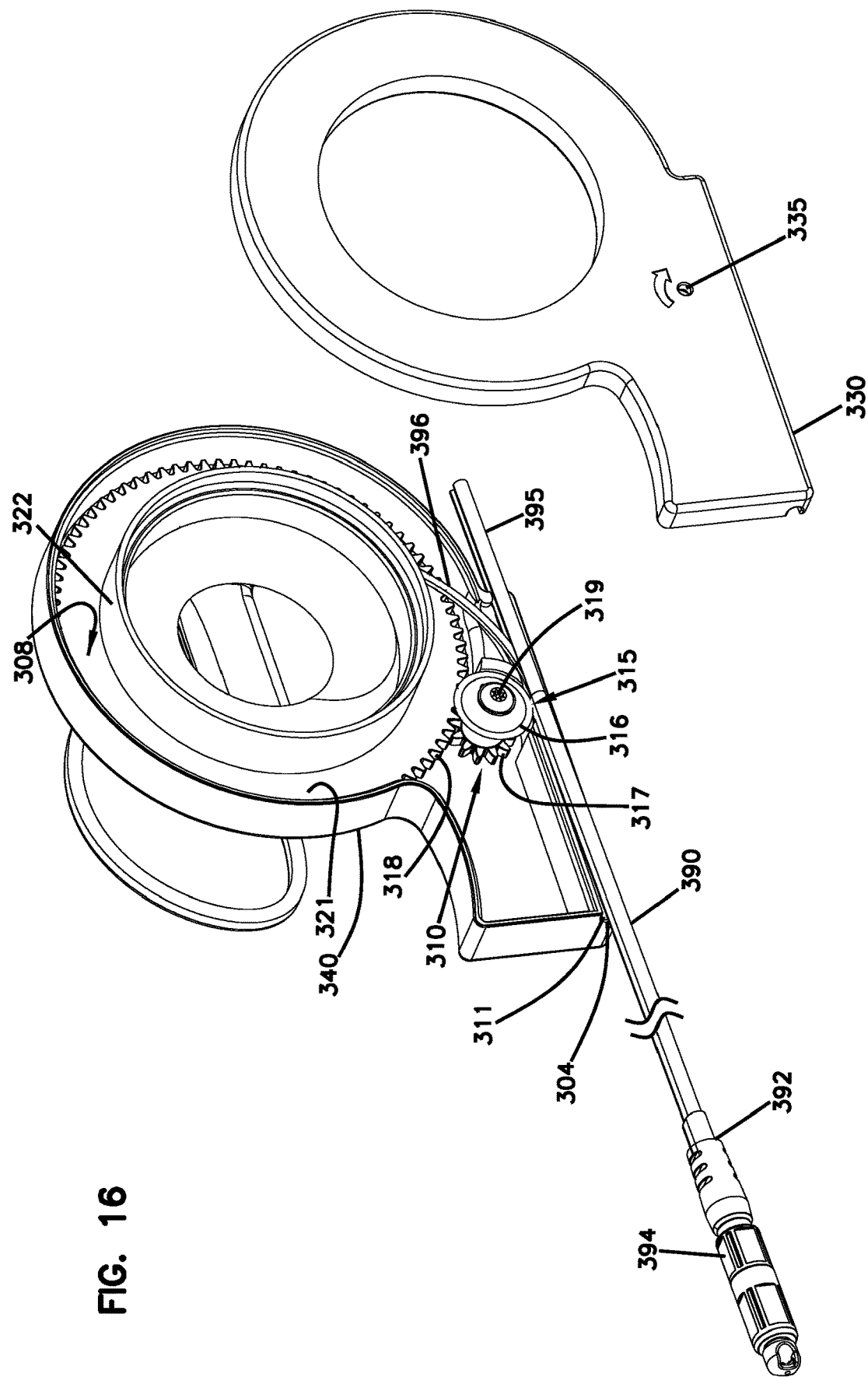
FIG. 16 is an exploded view of the cable storage device of FIG. 15.
Figure 17:
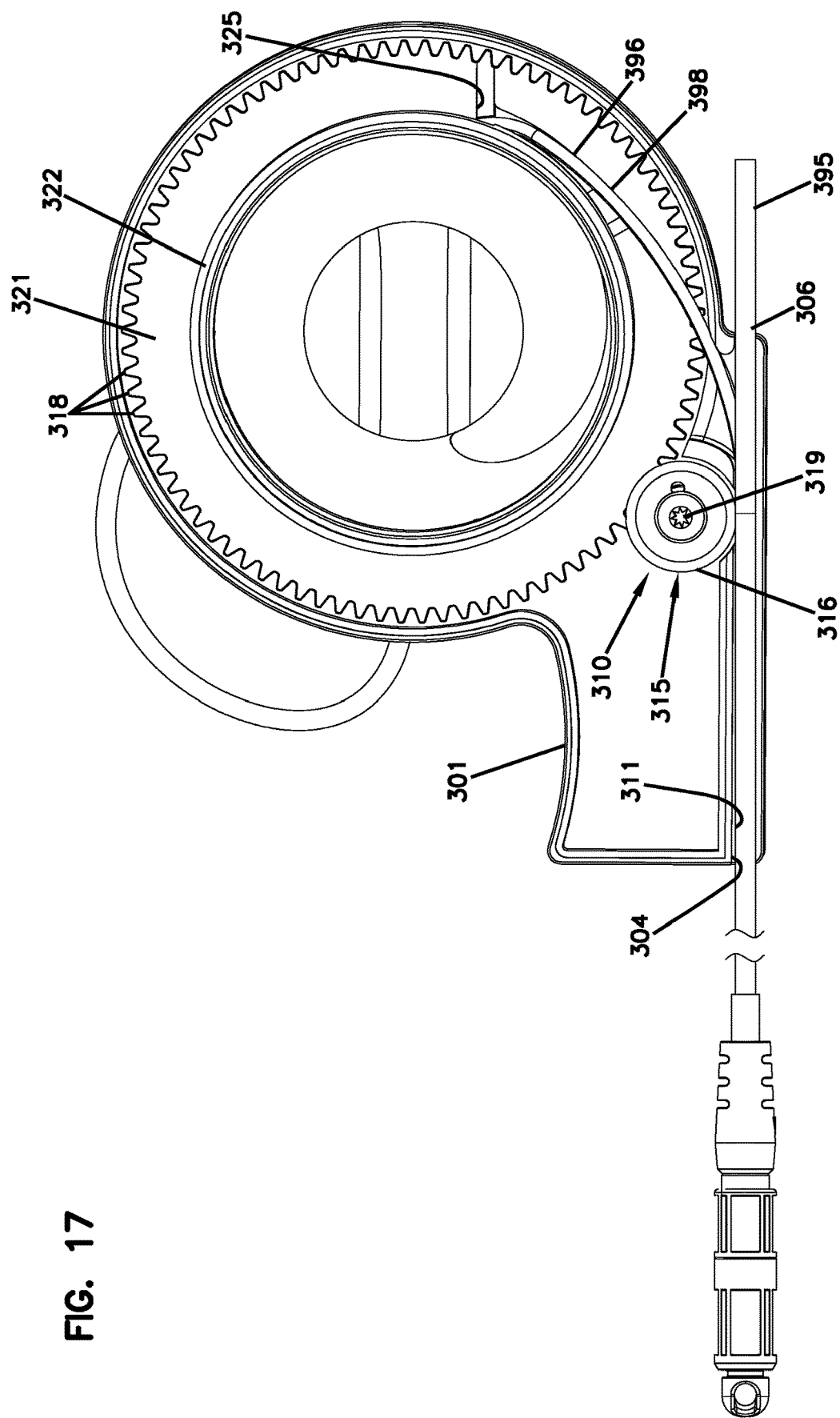
FIG. 17 is a side elevational view of the cable storage device of FIG. 15 with the first housing part removed for ease in viewing the removal station and storage region.

At least the jacket 395 of the cable 390 is cut at the removal station 310 so that one or more cable components can be removed from the jacket 395. In the example shown, a loose tube 398 holding a signal-carrying portion 396 of the cable 390 extends out of the cut jacket 395. FIGS. 16 and 17 illustrate one example cutting tool 315 disposed at the removal station 310. The cutting tool 315 has an annular blade 316 mounted to rotate unitarily with a gear 317. Rotating the gear 317 causes rotation of the blade 316. The storage spool 320 has radially outwardly extending teeth 318 (e.g., at a perimeter of the flange 321). The teeth 318 mesh with teeth of the gear 317 so that rotating the gear 317 causes rotation of the storage spool 320, which advances the cable 390 through the second port 304. Accordingly, the annular blade 316 slices the jacket 395 as the cable 390 is advanced past the removal station 310 by the storage spool 320.

In some implementations, the gear 317 can be rotated by rotating the storage spool 320 relative to the main housing 301 (e.g., using handle 323). For example, a user can grasp the main housing 301 in one hand, grasp the handle 323 in the other hand, and rotate the handle 323 relative to the main housing 301. In other implementations, the gear 317 can be rotated using a tool, e.g., a crank, a manual screw driver, an automatic screw driver (e.g., hand drill), or other such tool. The gear 317 defines a keyed recess 319 shaped to receive a keyed portion of the tool. The main housing 301 (e.g., first housing member 330) defines an aperture 335 that aligns with the keyed recess 319 to provide access to the keyed recess 319 from an exterior of the housing 301. The user can grasp the handle 323 in one hand and while using the other hand to insert the tool through the aperture 335 and into the keyed recess 319 and to operate the tool.

The separated jacket 395 can be discarded. In certain implementations, the signal-carrying portion 396 of the cable 390 is separated from the strength members 397 of the cable 390. The separated strength members 397 can be discarded. In certain implementations, the signal-carrying portion 396 is separated from both the jacket 395 and the strength members 397. Removing the bulkier or less flexible components (e.g., the jacket 395 and/or strength members 397) allows the signal-carrying portion 396 of the cable 390 to be stored more compactly (e.g., in a smaller diameter winding) than the full cable 390 otherwise could have been stored.

The loose tube 398 and/or signal-carrying portion 396 are directed from the removal station 310 to the storage region 308. In certain implementations, the loose tube 398 and/or signal-carrying portion 396 are stored in a loop at the storage region 308. In certain examples, the loose tube 398 and/or signal-carrying portion 396 are wound around the cable spool 320 at the storage region 308. In certain examples, winding the loose tube 398 and/or signal-carrying portion 396 around the cable spool 320 advances the cable 390 through the second cable port 304 and into the main housing 301.

The jacket 395 separated from the unjacketed portion of the cable 390 extends out of the main housing 301 through the exit aperture 306. For example, the user may initially route the jacket 395 through the exit aperture 306 when the unjacketed portion of the cable 390 is routed through the cable storage device 300. In some implementations, the exit aperture 306 is generally coaxial with the second cable port 304 (e.g., see FIG. 9). In other implementations, the exit aperture 306 faces away from the storage spool 320 out of alignment with the second cable port 304. In certain examples, winding the unjacketed portion of the cable 390 at the storage spool advances the jacket 395 through the exit aperture 306.

Figure 18:
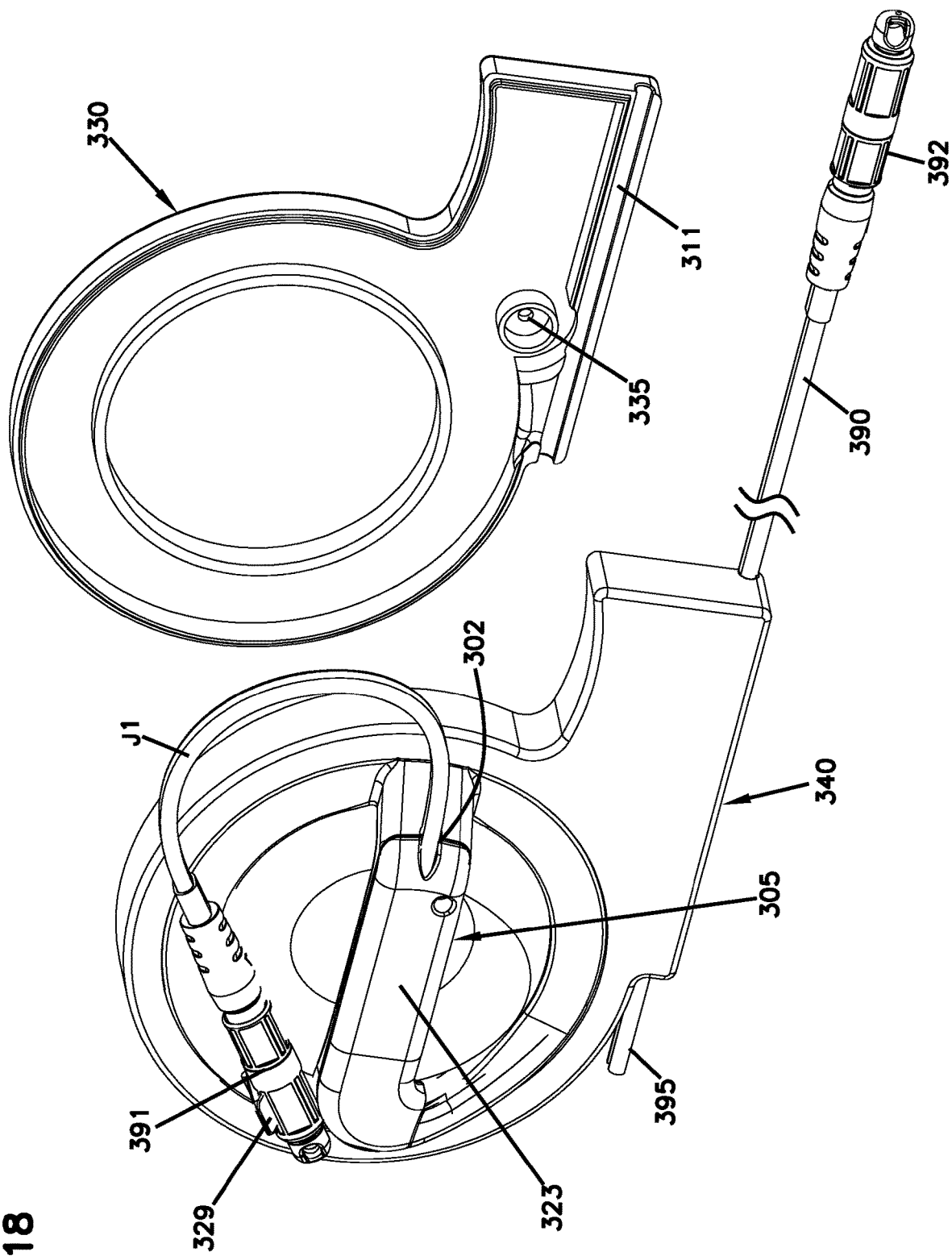
FIG. 18 is a perspective view of the cable storage device of FIG. 16 oriented so that the first cable port is visible.
Figure 19:
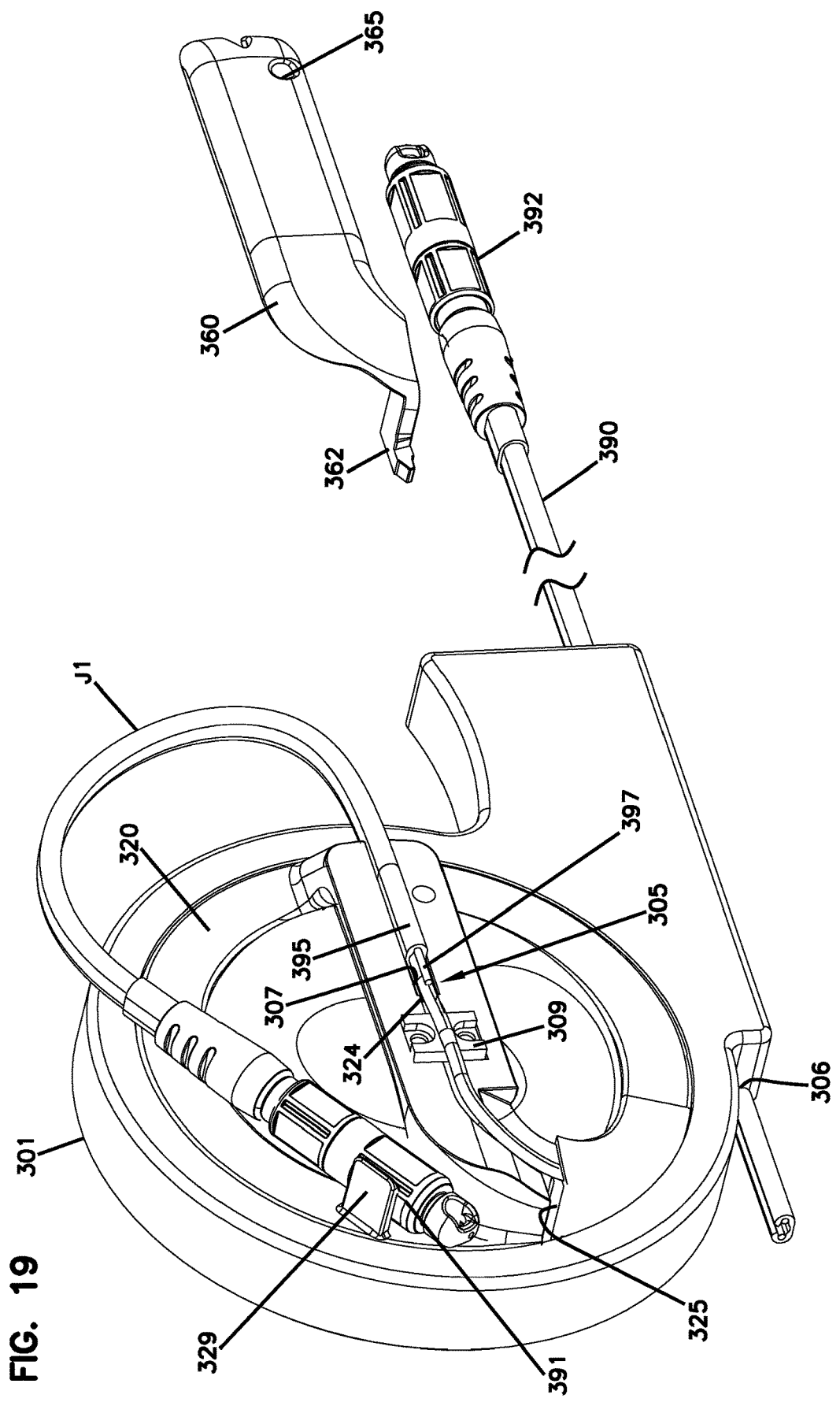
FIG. 19 is a perspective view of the cable storage device of FIG. 18 with a handle cover exploded away from the handle for ease in viewing the transition region.
Figure 20:
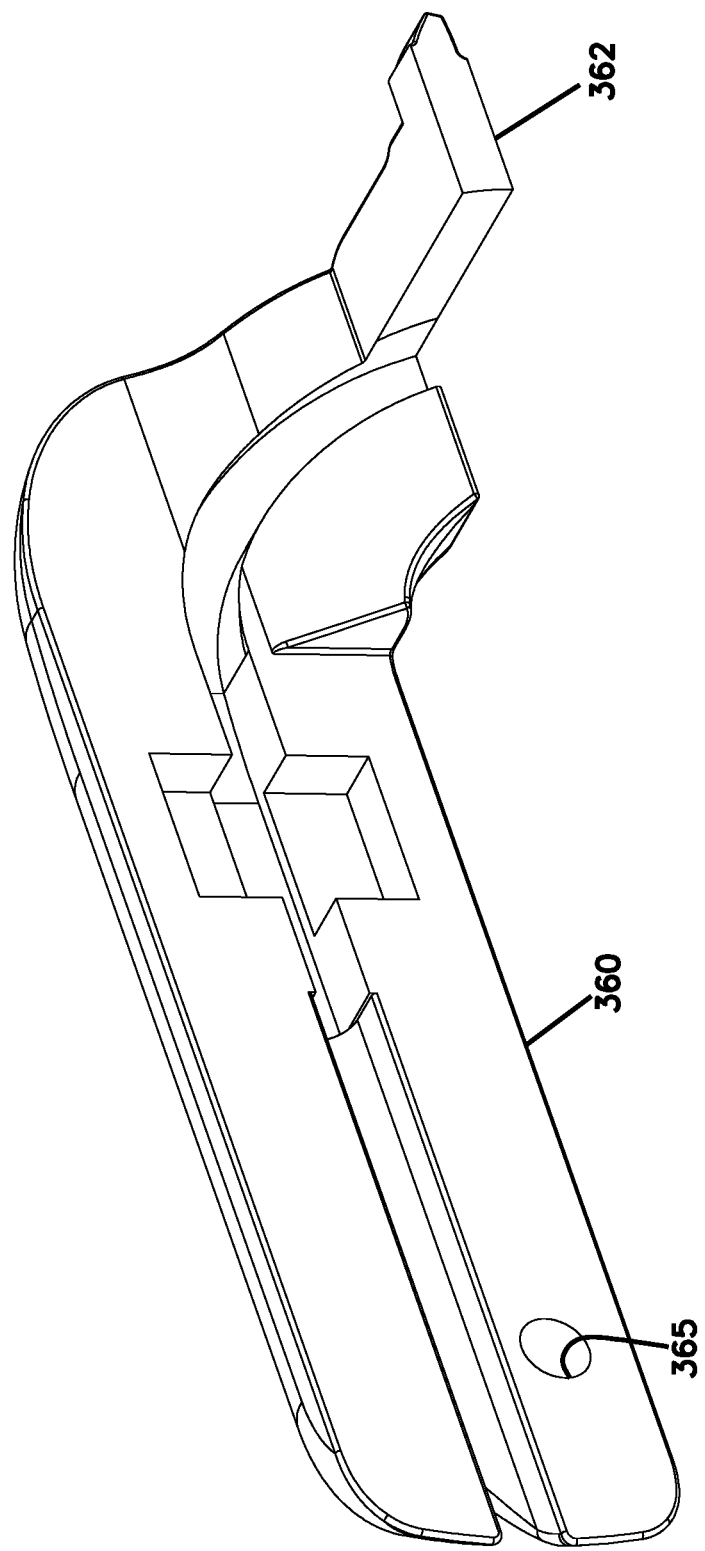
FIG. 20 is a perspective view of an interior surface of the handle cover.

As shown in FIGS. 18 and 19, the main housing 301 defines a first transition region 305 at which the unjacketed portion of the cable 390 transitions to a jacketed portion of the cable 390. The jacketed portion of the cable 390 extends out of the housing 301 at a cable port 302, which provides access to the first transition region 305. In certain implementations, the first transition region 305 is located on the handle 323 (see FIG. 11) of the storage spool 320. For example, a channel 324 extends from the first cable port 302, along the handle 323, through a slot 325 in the flange 321, to the drum 322 of the storage spool 320.

The first jacketed portion J1 of the cable 390 is axially retained at the first transition region 305. In certain examples, the first jacket portion J1 is rotationally retained at the first transition region 305. A first section 307 of the channel 324 extending inwardly from the cable port 302 has a first cross-dimension sized to receive the cable jacket 395 and/or strength members 397. In certain examples, the jacket 395 of the first jacketed portion J1 is terminated within the channel 324 and retained at the first channel section 307. In certain examples, the strength member(s) 397 of the first jacketed portion J1 are terminated and retained at the first channel section 307. In certain examples, both the jacket 395 and the strength member(s) 397 of the first jacketed portion J1 of the cable 390 are retained at the first channel section 307. In certain implementations, the jacket 395 and/or strength members 397 are retained by piercing, clamping, epoxying, or otherwise securing the jacket 395 and/or strength members 397 to the first channel section 307.

In certain implementations, a seal 309 is disposed in the channel 324 defined at the transition region 305. For example, the seal 309 may be spaced inwardly along the channel from the first channel section 307. In certain examples, the seal 309 is disposed at the unjacketed portion of the cable 390 (e.g., the signal carrying portion 306 or loose tube 308). In various examples, the seal 309 can include rubber, foam, gel, epoxy, or other sealing structures. The seal 309 inhibits water or other contaminants from entering the storage region 308 through the first cable port 302. For example, the seal 309 may surround the signal carrying portion 306 or loose tube 308 of the cable 390.

As shown in FIG. 19, a handle cover 360 mounts to the handle 323 to cover the channel 324. Accordingly, the handle cover 360 cooperates with the storage spool 320 and housing members 330, 340 to enclose the unjacketed portion of the cable 390. Accordingly, the unjacketed portion of the cable 390 is not accessible from an exterior of the cable storage device 300 when the cable storage device 300 is assembled with storage spool 320 held by the main housing 301 and the handle cover 360 mounted to the handle 323. In certain implementations, the handle cover 360 includes a filler portion 362 sized and shaped to fit over the slot 325 defined in the flange 321 of the storage spool 320.

In certain implementations, the handle cover 360 aids in retaining the first jacketed portion J1 of the cable 390 at the first transition region 305. For example, the handle cover 360 can cooperate with the handle 323 to clamp the jacketed first jacketed portion J1, can carry a fastener that extends through the first jacketed portion J1, or can cooperate with the handle 323 to hold adhesive about the first jacketed portion J1. In the example shown in FIG. 19, the handle 360 defines a fastener aperture 365 through which a fastener can extend into the handle 323. In an example, the fastener pierces the jacket 395 of the first jacketed portion J1. In another example, the fastener provides compression force between the handle 323 and the handle cover 360. In certain implementations, the handle cover 360 cooperates with the handle to environmentally seals the first cable port 302 or channel 324 extending therefrom. For example, the handle cover 360 may aid in retailing the seal 309 in the channel 324.

In certain implementations, a portion of the storage spool 320 accessible from an exterior of the main housing 101 includes a mounting station 329 (e.g., a latching arrangement, a mounting peg, etc.) at which the first axial end 391 of the cable 390 is secured. In certain examples, the mounting station 329 is configured to receive the connector terminating the first end 391 of the cable 390. Accordingly, the first axial end 391 of the cable 390 rotates unitarily with the cable storage spool 320 (e.g., while taking up slack length of the cable 390).

The mounting station 329 is spaced from the first cable port 302 so that the first jacketed portion J1 of the cable 390 extends between the first cable port 302 and the mounting station 329. Accordingly, when the first axial end 391 of the cable 390 is disconnected from the mounting station 329, the first jacketed portion J1 of the cable 390 has sufficient length to provide some flexibility in positioning and orienting the first axial end 391 to facilitate making a connection.

As noted above, the storage spool 320 is rotated relative to the main housing 301 to advance the cable 390 into the main housing 301 through the cable port 304 and past the removal station 310. The jacket and/or strength members of the cable 390 are pushed through the exit aperture 306. When a sufficient amount of slack length has been taken up by the spool 320, a user cuts the cable jacket extending out from the exit aperture 306 and discards the jacket. A closure member can be coupled to the main housing 301 to close the exit aperture 306. In certain implementations, the closure member can seal the exit aperture 306. In certain implementations, the closure member can axially retain the terminated end of the jacket and/or strength members of the cable 390 to inhibit axial pull-out of the cable 390 back through the port 304. In certain examples, the closure member can carry one or more fasteners that can pierce, clamp, or otherwise retain the jacket and/or strength members at the exit aperture 306 or elsewhere on the main housing 301.

In certain implementations, the closure member also includes a lock member that extends into the main housing and engages the storage spool 320 to inhibit rotation of the storage spool 320 relative to the main housing 301. In certain examples, the lock member extends through the exit aperture 306 and engages the teeth 318 of the storage spool 320. In other examples, the lock member can engage the gear 317 of the cutting tool 315. In other examples, the lock member can extend through a different aperture defined in the main housing 301.

In accordance with some aspects of the disclosure, one or more types of storage spools can be manufactured to fit with the same main housing. Accordingly, different storage devices having different functionality can be manufactured using the same main housing part. For example, the storage spools 120, 320 discussed above are configured to store excess length of a cable 190, 390 (e.g., an optical cable) in which each signal-carrying portion 396 extends between two axial ends. FIGS. 21-25 illustrate other types of storage spools 420, 520. The storage spools 420, 520 are configured to store excess length of an indexing cable 490, 590 in which only a portion of the signal-carrying portions 496, 596 extend between two axial ends of the cable 490, 590. One or more of the signal-carrying portions 496, 596 drop off between the two axial ends as will be discussed in more detail herein.

Figure 21:
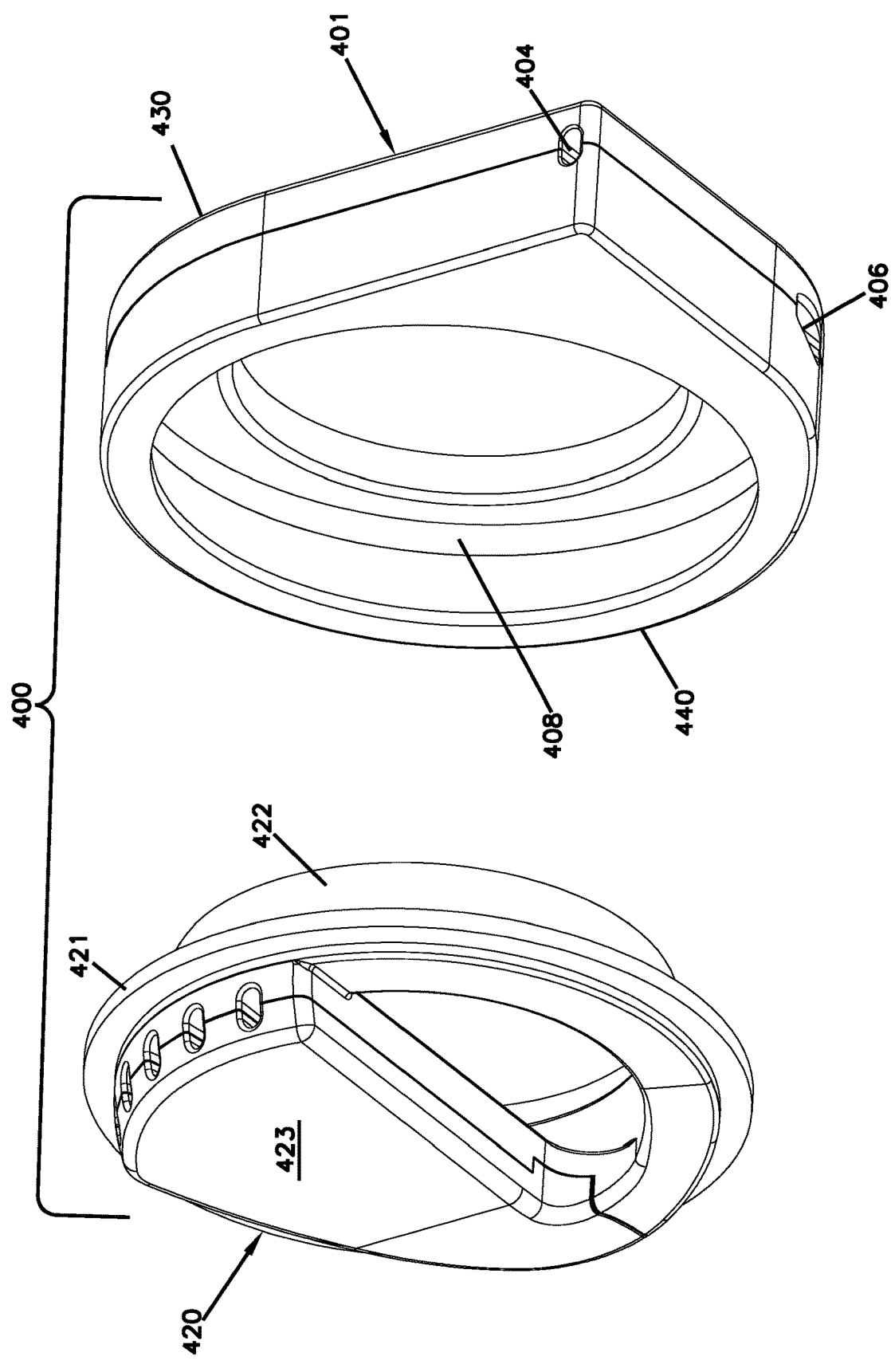
FIG. 21 is a perspective view of an example cable indexing spool exploded away from an example main housing.

For example, FIG. 21 illustrates an example main housing 401 and an example storage spool 420. The storage spool 420 includes a drum 422, a flange 421 extending radially outwardly from the drum 422, and a handle 423 defining a first cable port 402. Details on the storage spool 420 will be described in more detail herein. The main housing 401 defines a second cable port 404 leading to an interior of the main housing 401 in which a cable storage region 408 is defined. A removal station (e.g., removal station 110, 310 above) also can be disposed within the main housing 401 and use any of the cutting devices described herein. The main housing 401 also can define an exit aperture 406, which can be covered by a closure member (as described above with reference to storage devices 100, 300) when sufficient slack cable length has been stored. In certain implementations, the main housing 401 includes a first housing part 430 and a second housing part 440 that cooperate to sandwich the flange 421 of the storage spool 420 therebetween to retain the storage spool 420 at the storage region 408. In various implementations, the main housing 401 could alternatively hold the storage spool 120 of FIGS. 10 and 11 or the storage spool 320 of FIGS. 15-20.

Figure 22:
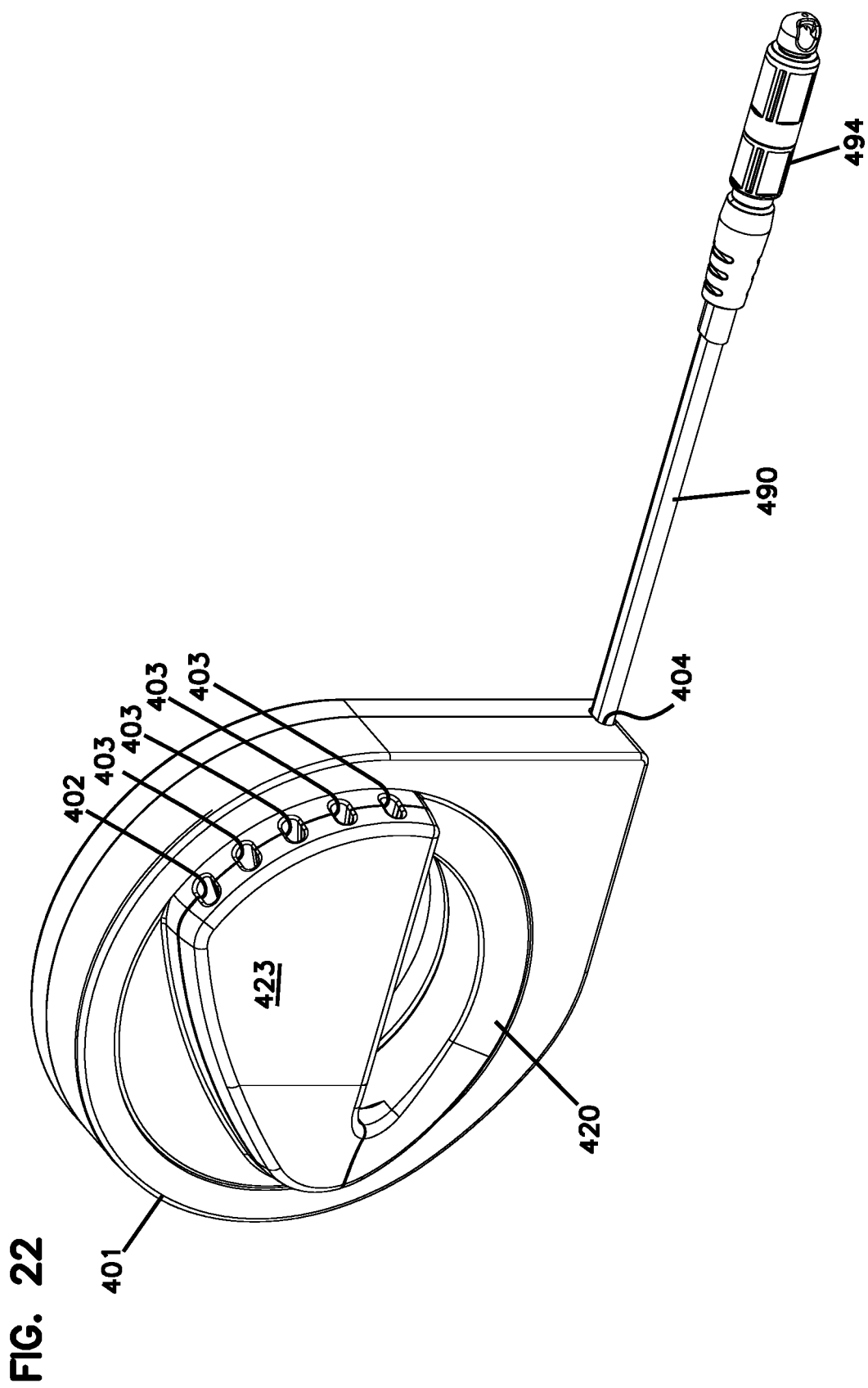
FIG. 22 is a perspective view of the cable spool and main housing of FIG. 21 assembled together to form an indexing storage device.
Figure 23:
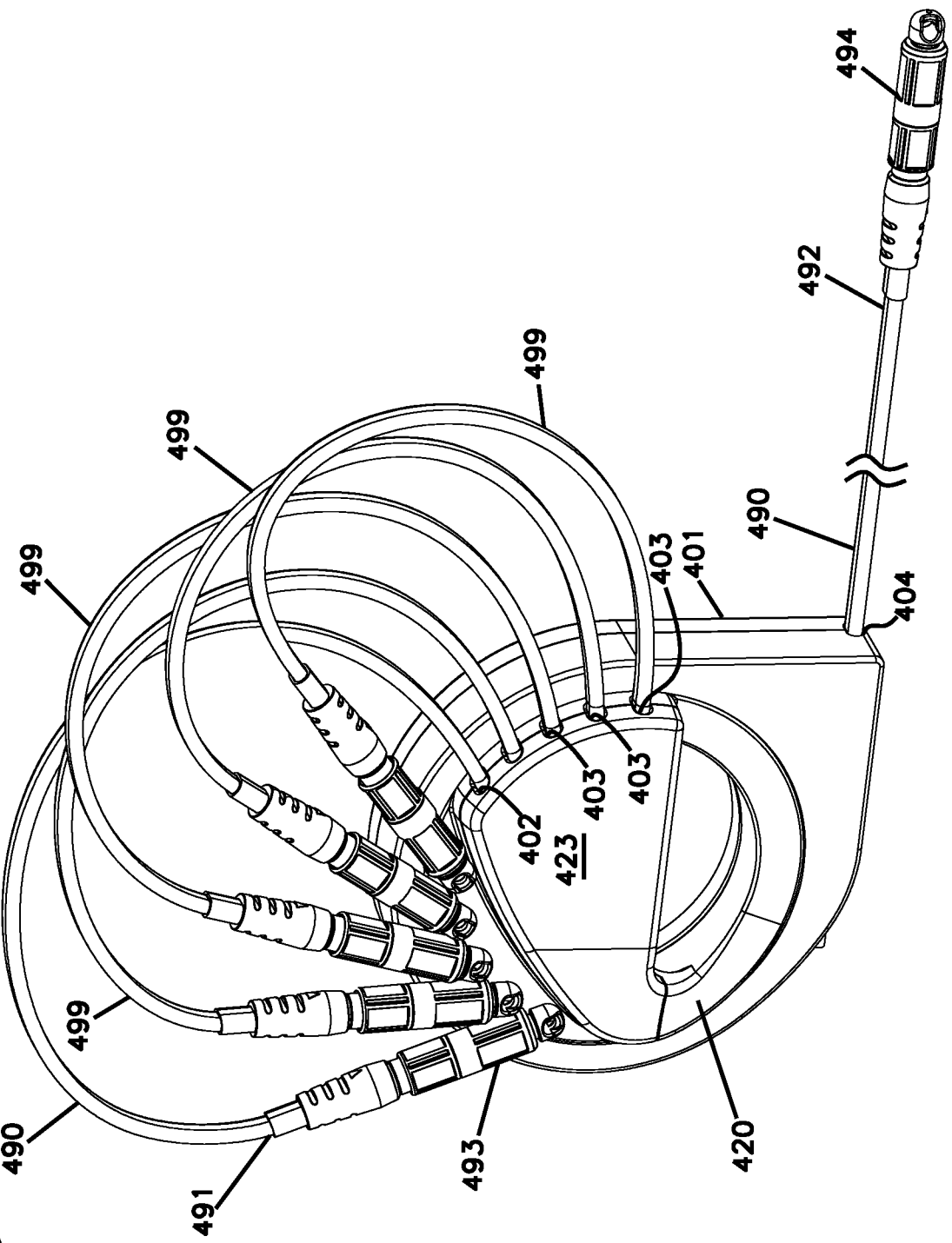
FIG. 23 is a perspective view of the indexing storage device of FIG. 22 with the drop lines pre-cabled on the device.

The cable storage spool 420 of FIGS. 21-23 is suitable for storing a slack length of an indexing cable 490. An indexing cable 490 includes multiple signal-carrying portions 496 that extend from one axial end 492, which is terminated at a multi-termination connector 494 (e.g., an MPO connector or a ruggedized multi-fiber connector) at the axial end 492. One or more of the signal-carrying portions 496 extend from the multi-termination connection 494 to one or more drop ends 499. A remainder of the signal-carrying portions 496 extends from the multi-termination connector 494 to another axial end 491 of the cable 490. The signal-carrying portions 496 of the remainder are terminated at a multi-termination connector 493 (e.g., an MPO connector or a ruggedized multi-fiber connector) at the axial end 491.

Each of the multi-termination connectors 493, 494 has a number of sequential termination positions. The signal-carrying portions 496 are indexed between the first and second multi-termination connectors 493, 494 by dropping off a signal-carrying portions 496 extending from the first sequential position of the multi-termination connector 494 and routing the signal-carrying portion 496 from the next sequential position of the multi-termination connector 494 to the first sequential position of the multi-termination connector 493. Of course, more than one signal-carrying portion 496 can be dropped off. Regardless of how many signal-carrying portions 496 are dropped off, the next sequential signal-carrying portion 496 that is not dropped off is routed to the first sequential position on the multi-termination connector 493.

Indexing the signal-carrying portions 496 of the cable 490 between the first and second multi-termination connections 493, 494 ensures that a live signal-carrying portion 496 will be provided at the first sequential position of each multi-termination connections 493, 494 while allowing one or more signal-carrying portions 496 of the cable 490 to drop off (i.e., be separated from the remainder of the cable 490). Two or more such cables 490 can be strung together (e.g., daisy-chained) to form an extended cable by connecting the first multi-termination connection 493 of a second cable 490 to the second multi-termination connection 494 of the first cable 490. Because the signal-carrying portions 496 are indexed along each cable 490, a live signal-carrying portion 496 is always provided at the first sequential position of each first multi-termination connection 493 along the extended cable while allowing one or more signal-carrying portions 496 to drop off at one or more drop off positions along the length of the extended cable.

As shown in FIG. 22, the storage spool 420 of the storage device 400 includes a projection 423 that extends out from and is accessible from an exterior of the main housing 401. In certain examples, the projection 423 can function as a handle for the cable spool 420. The projection 423 defines the first cable port 402 through which the jacketed portion of the cable 490 extends to the multi-termination connector 493 (see FIG. 23). In certain implementations, the projection 423 also defines a mounting station 429 at which the connector 493 can be retained to rotate in unison with the storage spool 420.

The projection 423 also defines at least one drop port 403 through which the drop line 499 of the cable 490 is made accessible from an exterior of the main housing 401. In some implementations, the cable port 402 is the same size as the drop cable ports 403. In other implementations, the cable port 402 can be larger than the drop cable ports 403. Because the drop ports 403 are defined by the projection 423, the drop ports 403 are carried by the storage spool 420 when the storage spool 420 rotates relative to the main housing 401.

In some implementations, the drop cable ports 403 are aligned in a row. In other implementations, the drop cable ports 403 can be arranged in any desired pattern or configuration. In certain implementations, the cable port 402 can be aligned with the drop cable ports 403. In some implementations, the drop cable ports 403 are disposed on the storage spool 420 to face in a generally common direction (e.g., same directional quadrant). As the term is used herein, a directional quadrant refers to a 90° radius extending radially outwardly from the storage spool 420. As the term implies, the storage spool 420 has four directional quadrants. In other implementations, the drop cable ports 403 can be spaced along a circumference of the projection 423 to face multiple directional quadrants.

The indexing of the signal-carrying portions 496 occurs within the storage device 400. In certain implementations, all of the signal-carrying portions 496 of the indexing cable 490 are separated from the jacket and/or strength members of the cable 490 at the removal station within the main housing 401 and routed to the storage region 408. All of the signal-carrying portions 496 are transitioned through the slot in the flange 421 and into a channel defined in the projection 423. Within the projection 423, one or more of the signal-carrying portions 496 are separated from a remainder (which includes one or more) of the signal-carrying portions 496. Each of the separated signal-carrying portions 496 forms a drop line 499 and is routed towards one of the drop ports 403.

In some implementations, a drop line 499 is made accessible through a drop port 403 by routing the drop line 499 through the drop port 403 to an exterior of the cable storage device 400 (see FIG. 23). Accordingly, the drop line 499 forms a tether having a free end external of the storage device 400. In such implementations, the free end of each drop line 499 is jacketed and terminated at a connector (e.g., a single-fiber connector, a multi-fiber connector, an electrical connector, a male connector, a female connector, etc.). In certain examples, the drop line 499 is terminated by a ruggedized connector (e.g., a single-fiber ruggedized connector, a multi-fiber ruggedized connector, etc.). Each drop line 499 can be connected to another cable (e.g., a subscriber cable, a cable leading to a drop terminal, a cable leading to a splitter, etc.) external of the storage device 400.

In alternative implementations, two or more drop lines 499 can be routed through the same drop port 403. For example, a drop port 403 can be sized to fit two or more tethers. In another example, two or more dropped signal-carrying portions 496 can be jacketed together as one tether and terminated by a multi-fiber connector (e.g., an MPO, a ruggedized multi-fiber connector, etc.).

Figure 24:
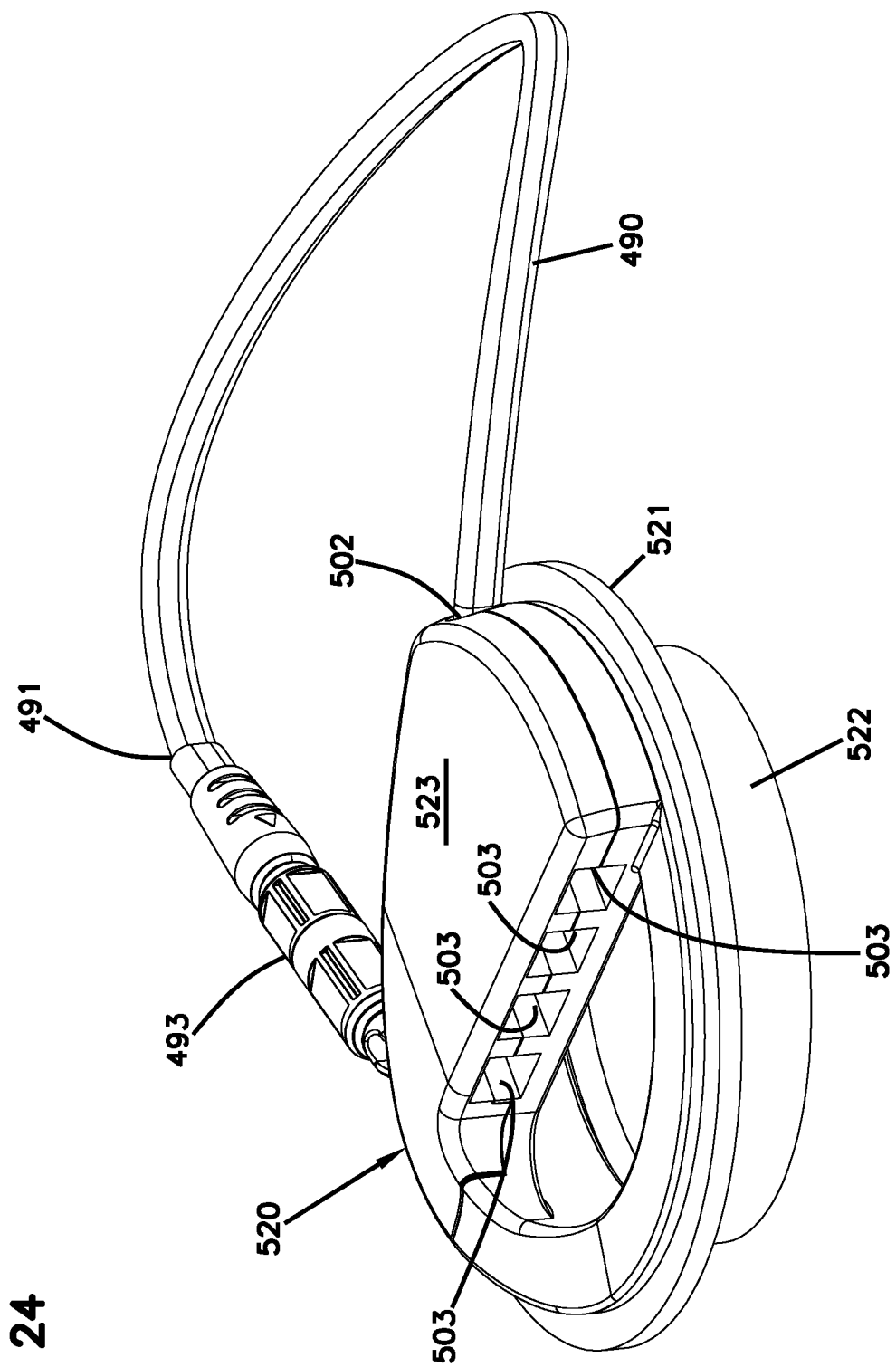
FIG. 24 is a perspective view of another example cable indexing spool.
Figure 25:
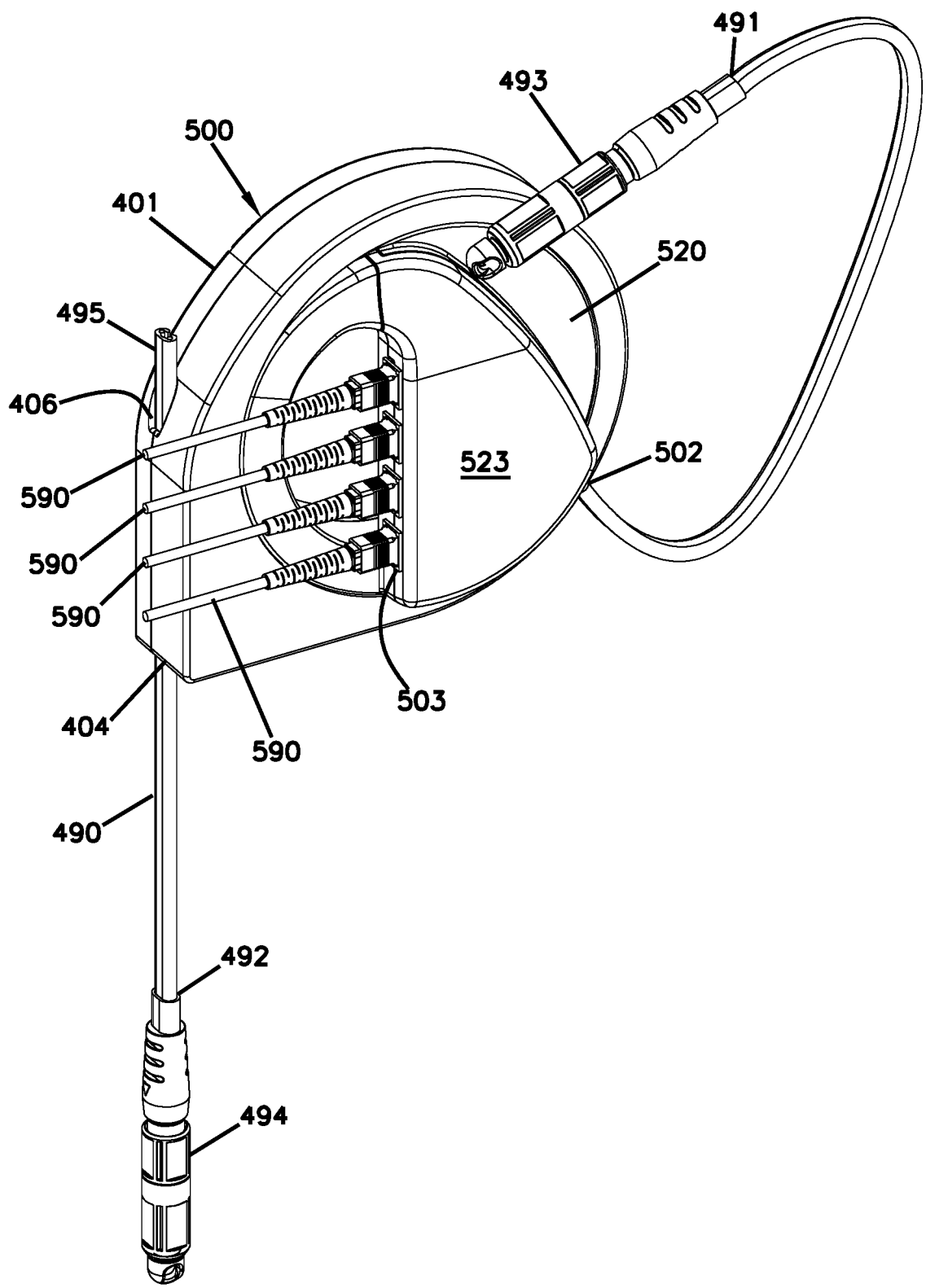
FIG. 25 is a perspective view of the cable indexing spool of FIG. 24 assembled with the main housing of FIG. 21.

FIGS. 24 and 25 illustrate another alternative implementation of an indexing storage spool 520 including a flange 521 extending radially outwardly from a drum 522. The storage spool 520 also includes a projection 523 that defines the cable port 502 through which the first axial end 491 of a cable 490 extends. The projection 523 also defines one or more drop ports 503. The spool 520 also includes a mounting station at which a connector 593 terminated the first axial end 491 of the cable 490 is held.

In the example of FIGS. 24 and 25, a drop line 499 of the cable 490 is made accessible through a drop port 503 using an adapter (e.g., an optical adapter, an electrical adapter, etc.). In such implementations, the adapter is carried by the projection 523. The adapter defines an interior port that receives the drop line 499 and defines an exterior port that functions as the drop port 503. A separate cable 590 for carrying the dropped signal can be plugged into the drop port 503 and thereby connected to the drop line 499 subsequent to taking up slack length of the cable 490.

As noted above, the drop cable ports 503 are aligned in a row in some example storage spools 520. In other implementations, the drop cable ports 503 can be arranged in any desired pattern or configuration. In some implementations, the drop cable ports 503 are disposed on the storage spool 520 to face in a generally common direction (e.g., same directional quadrant). In certain implementations, the cable port 502 can face in a different directional quadrant from the drop ports 503.

As shown in FIG. 25, the cable storage spool 520 can be mounted in the main housing 401 to hold the indexing cable 490. In other implementations, a different type of storage spool could be mounted in the main housing 401.

In use, a storage spool 120, 320, 420, 520 is installed in the main housing 101, 301, 401. A jacket 195, 395, 495 of the cable 190, 390, 490 is cut away from a portion of the cable 190, 390, 490. The unjacketed portion of the cable 190, 390, 490 is routed within the main housing 101, 301, 401 from the cable port 104, 304, 404, past the removal station 100, 310, to the cable spool 120, 320, 420, 520. The cable jacket ending at one end of the unjacketed portion is secured to the cable spool 120, 320, 420, 520 (e.g., at the transition region 105, 305). The cable jacket at the other end of the unjacketed portion is routed through the exit aperture 106, 306, 406.

Once assembled, the storage device 100, 300, 400, 500 can be deployed in the field. In some implementations, the first axial end 191, 391, 491 of the cable 190, 390, 490 is plugged into a first network port (e.g., a subscriber port, a drop terminal port, an indexing terminal port, a fiber distribution hub port, an ONT port, a network interface device port, etc.) and the second axial end 192, 392, 492 of the cable 190, 390, 490 is plugged into a second network port (e.g., a subscriber port, a drop terminal port, an indexing terminal port, a fiber distribution hub port, an ONT port, a network interface device port, etc.) that is remove from the first network port.

When a user knows how much cable length is needed to span the two network ports, the user can wind up the slack length of the cable 190, 390, 490 using the storage device 100, 300, 400, 500. The user takes up slack length by rotating the storage spool 120, 320, 420, 520 relative to the main housing 101, 301, 401. In some implementations, the user can rotate the cable spool 120, 320, 420, 520 manually if a small amount of slack length needs to be taken up. In other implementations, the user can rotate the cable spool 120, 320, 420, 520 using a tool (e.g., a power drill, a crank, etc.) if a large amount of slack length needs to be taken up.

In accordance with some aspects of the disclosure, cable ports 102, 302, 402, 403, 502, 503 defined on the cable spool 120, 320, 420, 520 can be selectively rotationally positioned relative to the main housing 101, 301, 401 based on the network configuration. For example, if the storage device 100, 300, 400, 500 is mounted to a pole, the main housing 101, 301, 401 can be oriented on the pole so that the cable port 104, 304, 404 faces downwardly towards the ground to aid in routing the cable 190, 390, 490 up the pole. In some implementations, the storage spool 120, 320, 420, 520 can be rotationally positioned relative to the main housing 101, 301, 401 so that the cable port 102, 302, 402, 502 faces in a desired direction relative to the main housing 101, 301, 401, 501. For example, the storage spool 120, 320, 420, 520 can be rotationally positioned so that the cable port 102, 302, 402, 502 faces towards a subscriber port. As will be noted, the cable port 102, 302, 402, 502 can be adjusted to face in any desired direction along a 360° path relative to the cable port 104, 304, 404.

In some implementations, cables 590 connecting to the drop lines 499 at ports 503 or at connectors terminating the drop tethers may extend away from the storage device 100, 300, 400, 500 in a different direction from the cable ends 191, 192, 391, 392, 491, 492. For example, the cables 590 may extend along aerial cables routed between poles. Accordingly, the storage spool 120, 320, 420, 520 can be rotationally positioned relative to the main housing 101, 301, 401 to face in the direction along which the cables 590 are routed (e.g., towards the aerial cables).

In some implementations, the spool 120, 320, 420, 520 can be rotationally locked relative to the main housing 101, 301, 401 after selectively rotationally positioning the spool 120, 320, 420, 520. For example, a lock member can be engaged with the spool 120, 320, 420, 520 by mounting a closure member (e.g., closure member 180) at the exit aperture 106, 306, 406.

In accordance with certain aspects of the disclosure, after each indexing step along an extended cable, at least one additional signal-carrying portion 496 of the extended cable is no longer used since it is not connected to service through the first multi-fiber connector. The unused fibers in this instance would be dead fibers. In certain implementations, another cable (not shown) can be routed from the network (e.g., from a fiber distribution hub) to mate with the multi-fiber connector terminating the first axial end of the cable. The another cable provides redundancy within the system by providing a second path by which signals can be carried from the network (e.g., the fiber distribution hub) to all of the storage terminals 100, 300, 400, 500. The optical signals would be carried over the otherwise-would-be-dead fibers along the chain.

Additional information regarding fiber indexing can be found in U.S. Publication No. 2014/0254986 and U.S. Pat. No. 9,348,096, the disclosures of which are hereby incorporated herein by reference.

For example, the dead fibers can be used to carry signals as live fibers. These signals are carried from the fiber distribution hub network, over the another cable, to the first axial end 191, 391, 491 of the cable 190, 390, 490. This implementation can double the capacity of the system by having signals traveling in one direction as they are indexed up in the multi-fiber connectors, and a second set of signals in the opposite direction as the fibers are indexed into the multi-fiber connectors as new fibers. This bi-directional usage is advantageous in a fiber loop or fiber ring. Another advantage could arise as a redundant fiber path that could serve the drop locations that are downstream from a cable cut. Additional information regarding fiber indexing and bi-directional fiber indexing can be found in U.S. Pat. No. 9,348,096, the disclosure of which is incorporated by reference above.

In accordance with other aspects of the disclosure, one or more of the above described cable spools 120, 320, 420, 520 can be utilized with a main housing that does not include a removal station. For example, the cable spools can be mounted to such a main housing to form a termination device, an indexing device, etc. In such implementations, the jacket of the cable is not removed. Rather, less of cable is wrapped around the storage spool. In some such implementations, the cable can be wrapped around the storage spool in the factory and dispensed from the spool in the field. In other such implementations, the cable spool is locked against rotation relative to the main housing and a constant length of cable extends outwardly from the various ports.

Figure 26:
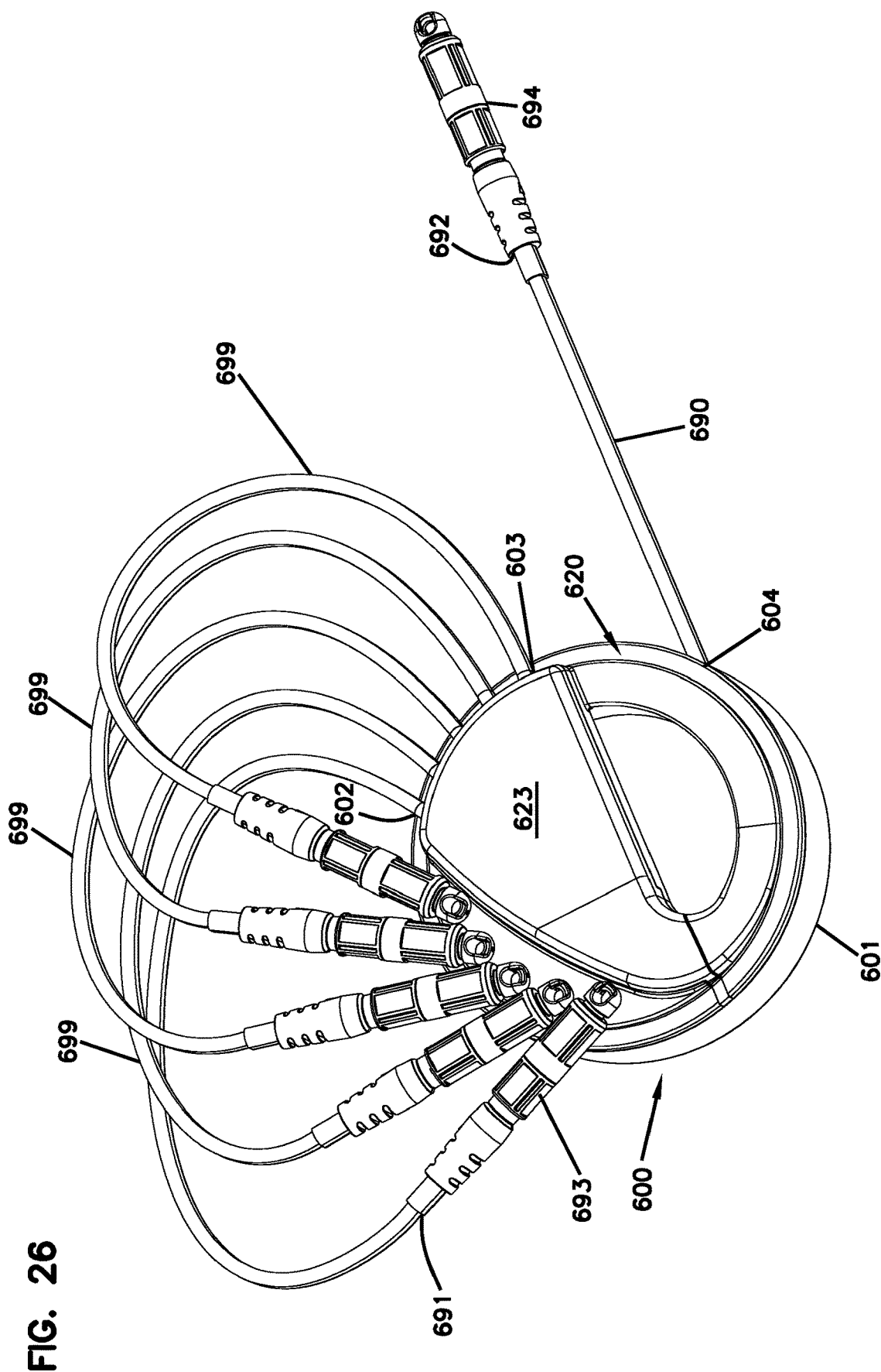
FIG. 26 is a perspective view of an indexing device structured and assembled in accordance with the principles of the present disclosure.

FIG. 26 illustrates one example of an indexing terminal 600 providing terminations for an indexing cable 690. The indexing cable 690 has one end 692 terminated by a multi-fiber connector 694. The indexing cable 690 includes at least one signal-carrying portion that extends from the multi-fiber connector 693 to a second multi-fiber connector 693 that terminates another axial end 691 of the cable 690. Another signal-carrying portion of the cable 690 extends from the multi-fiber connector 694 to a drop line connector. In the example shown, four signal-carrying portions extend from the multi-fiber connector 694 to respective drop line connectors. In other examples, any number of drop lines between 1 and n−1 can be dropped where n equals the number of sequential termination positions of the multi-fiber connector 694.

The indexing terminal 600 includes a main housing 601 and a cable spool 620. The main housing 601 defines a cable port 604 through which the cable 690 enters the main housing 601. In certain implementations, the main housing 601 does not define an exit aperture since the jacket is not separated from the cable 690. In certain implementations, the main housing 601 also does not define a handle to facilitate rotation of the cable spool relative to the main housing 601. In an example, the main housing 601 is devoid of features that facilitate rotation of the cable spool 620 relative to the housing 601. In examples, the cable spool 620 is rotationally locked to the main housing 601. For example, a lock member within the main housing 601 may engage a portion of the cable spool 620 to inhibit rotation. In such implementations, the amount of cable extending out of the cable port 604 is fixed.

In the example shown, the cable spool 620 is substantially similar to the cable spool 420 of FIGS. 21-23. In other examples, the cable spool 620 can be substantially similar to the cable spool 520 shown in FIGS. 24-25. In still other examples, the cable spool 620 can be substantially similar to the cable spool 120 shown in FIGS. 7-8. For example, the storage spool 620 can be mounted to the main housing 601 to form a termination device instead of an indexing device.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

| Parts List | |
|---|---|
| 10 | network |
| 11 | central office |
| 12 | break-out location |
| 13 | fiber distribution hub |
| 14 | drop terminal |
| 15 | end subscribers |
| 100, 201, 202, 203, 300, 400, 500, 600 | cable storage device |
| 101, 301, 401, 501, 601 | main housing |
| 101A | removable portion |
| 101B | storage portion |
| 102, 302, 402, 502, 602 | first cable port |
| 403, 503, 603 | drop ports |
| 104, 304, 404, 604 | second cable port |
| 105, 305 | first transition region |
| 106, 306, 406 | exit aperture |
| 108, 308, 408 | storage region |
| 110, 310 | removal station |
| 111, 311 | channel |
| 115, 315 | cutting device |
| 116, 316 | blade |
| 120, 320, 420, 520, 620 | storage spool |
| 121, 321 | flange |
| 122, 322 | drum |
| 123, 323, 423, 523, 623 | handle |
| 124, 324 | channel |
| 125, 325 | slot |
| 126 | ramp |
| 127 | raised portion |
| 128 | support structure |
| 129, 329 | mounting station |
| 130, 330, 430 | first housing member |
| 131 | first portion |
| 132 | round portion |
| 135 | handle |
| 140, 340, 440 | second housing member |
| 141 | first portion |
| 142 | round portion |
| 160, 360 | handle cover |
| 162, 362 | filler portion |
| 190, 390, 490, 690 | cable |

-continued

Parts List

| | |
|---|---|
| 191, 391, 491, 591, 691 | first axial end |
| 192, 392, 492, 592, 692 | second axial end |
| 193, 393, 493, 593, 693 | first connector |
| 194, 394, 494, 594, 694 | second connector |
| 195, 395 | jacket |
| 196, 396 | signal-carrying portion |
| 197, 397 | strength member |
| 198, 398 | loose tube |
| 499, 699 | drop end |
| 307 | first channel section |
| 317 | gear |
| 318 | teeth |
| 319 | keyed recess |
| 335 | aperture |
| 365 | aperture |
| 590 | drop cable |

What is claimed is:

1. A storage device for storing excess length of a cable, the storage device comprising:
a housing defining an entrance aperture and an exit aperture;
a spool carried by the housing, the spool being rotatable relative to the housing, the spool defining a cable port;
a cutting tool carried by the housing, the cutting tool being disposed between the entrance aperture and the spool; and
a channel defined in the housing leading from the entrance aperture, past the cutting tool, to the exit aperture, the channel also opening to a drum of the spool.

2. The storage device of claim 1, wherein the spool includes a handle configured to facilitate rotation of the spool by a user.

3. The storage device of claim 2, wherein the handle defines a channel leading from the spool to the cable port.

4. The storage device of claim 2, wherein the handle is a first handle, and wherein the housing includes a second handle disposed at an opposite side of the storage device from the first handle, the first handle being movable relative to the second handle.

5. The storage device of claim 1, wherein the spool includes a mounting station configured to receive a first axial end of a cable to rotate in unison with the spool relative to the housing.

6. The storage device of claim 5, wherein the mounting station includes a flexible arm configured to latch to a connector terminating the first axial end of the cable.

7. The storage device of claim 1, wherein the cutting tool is a blade held stationary relative to the housing.

8. The storage device of claim 1, wherein the cutting tool moves relative to the housing.

9. The storage device of claim 1, wherein the housing includes a first housing piece and a second housing piece that hold at least a portion of the spool therebetween so that the spool is rotatable relative to both the first and second housing pieces.

10. The storage device of claim 1, further comprising a cable extending between a first axial end and a second axial end, each axial end being external of the housing, a bight of the cable extending through the entrance aperture, along the channel, to the cutting tool at which a jacket of the cable is separated from an inner portion of the cable, the jacket extending through the exit aperture, the inner portion being wrapped around the spool.

11. The storage device of claim 1, wherein the housing is configured to enable stacking of multiple storage devices.

12. The storage device of claim 1, wherein the entrance aperture aligns with the exit aperture.

13. A storage device storing excess length of a cable extending between first and second axial ends of the cable, the cable having a first jacketed portion disposed at the first axial end, a second jacketed portion disposed at the second axial end, and an unjacketed portion disposed between the first and second jacketed portions, the second jacketed portion of the cable being longer than the first jacketed portion of the cable, the storage device comprising:
a housing defining an interior;
a first cable port through which the first jacketed portion of the cable extends into the housing so that the first axial end of the cable is external of the housing;
a second cable port through which the second jacketed portion of the cable extends into the housing so that the second axial end of the cable is external of the storage device;
a removal station disposed at the housing, the removal station being configured to separate an inner portion of the second jacketed portion of the cable from a jacket of the second jacketed portion of the cable, thereby lengthening the unjacketed portion of the cable;
a storage spool disposed within the interior of the housing, the storage spool being configured to wind the inner portion of the cable, wherein the storage spool is rotatable relative to the housing; and
an exit aperture through which the jacket from which the inner portion is separated exits the housing.

14. The storage device of claim 13, wherein the housing provides axial pull resistance at the first and second cable ports to inhibit the first and second jacketed portions from pulling out of the respective cable ports.

15. The storage device of claim 13, wherein a blade arrangement is disposed at the removal station between the first cable port and the storage spool.

16. The storage device of claim 15, wherein the blade arrangement includes a stationary blade.

17. The storage device of claim 15, wherein the blade arrangement includes an annular blade that is rotatable relative to the housing.

18. The storage device of claim 17, wherein the blade arrangement also includes a gear that rotates in unison with the annular blade, and wherein the storage spool includes radially outwardly extending teeth that mesh with the gear.

19. The storage device of claim 13, wherein the blade arrangement defines a keyed recess sized and shaped to receive a tool to aid in rotating the storage spool relative to the housing.

20. The storage device of claim 13, wherein the storage spool includes a handle and the housing includes a handle that facilitate rotating the storage spool relative to the housing.

21. The storage device of claim 13, wherein the storage spool defines a mounting station at which the first axial end of the cable can be disposed to rotate in unison with the storage spool.

22. The storage device of claim 13, wherein the storage spool defines at least one drop port.

23. The storage device of claim 22, further comprising the cable having the inner portion wound around the storage spool, the first jacketed portion extending out of the first cable port, and the second jacketed portion extending out of the second cable port, wherein the inner portion includes a plurality of signal-carrying portions, at least one of the signal carrying portions extending between the first and second axial ends of the cable, at least another of the signal carrying portions extending from the first axial end of the cable to a drop end that is accessible via the at least one drop port.

24. The storage device of claim 23, wherein the drop end extends out of the housing through the at least one drop port.

25. The storage device of claim 23, wherein the storage spool includes an adapter defining an interior port and an exterior port, the interior port receiving the drop end, the exterior port being accessible from an exterior of the housing.

* * * * *